United States Patent
Zhou

(10) Patent No.: US 11,362,766 B2
(45) Date of Patent: Jun. 14, 2022

(54) METHOD AND APPARATUS FOR OBTAINING HARQ FEEDBACK AND METHOD AND APPARATUS FOR TRANSMITTING HARQ FEEDBACK

(71) Applicant: Beijing Xiaomi Mobile Software Co., Ltd., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 8 days.

(21) Appl. No.: 16/348,637

(22) PCT Filed: Nov. 14, 2016

(86) PCT No.: PCT/CN2016/105728
§ 371 (c)(1),
(2) Date: May 9, 2019

(87) PCT Pub. No.: WO2018/086121
PCT Pub. Date: May 17, 2018

(65) Prior Publication Data
US 2019/0312685 A1  Oct. 10, 2019

(51) Int. Cl.
*H04L 1/18* (2006.01)
*H04W 72/04* (2009.01)

(52) U.S. Cl.
CPC .......... *H04L 1/1812* (2013.01); *H04L 1/1858* (2013.01); *H04L 1/1887* (2013.01); *H04W 72/0446* (2013.01)

(58) Field of Classification Search
CPC ... H04L 1/1812; H04L 1/1858; H04L 1/1887; H04L 1/1864; H04L 1/1854; H04L 1/1896; H04W 72/0446
See application file for complete search history.

(56) References Cited

U.S. PATENT DOCUMENTS 9,215,041 B2   12/2015  Lohr et al.
2005/0249120 A1  11/2005  Heo et al.
(Continued)

FOREIGN PATENT DOCUMENTS

CN   1722652 A    1/2006
CN   103119899 A  5/2013
(Continued)

OTHER PUBLICATIONS

English version of International Search Report of PCT Application No. PCT/CN2016/105728, dated Mar. 29, 2017, issued by the ISA/CN—State Intellectual Property Office of the P.R. China.
(Continued)

*Primary Examiner* — John D Blanton
(74) *Attorney, Agent, or Firm* — Finnegan, Henderson, Farabow, Garrett & Dunner, L.L.P.

(57) ABSTRACT

The present disclosure provides a method and an apparatus for obtaining HARQ feedback and transmitting HARQ feedback. The method of obtaining HARQ feedback includes: short TTI scheduling information is configured into a first target long TTI according to service requirements; the short TTI scheduling information is sent to second equipment through the first target long TTI; one or more short TTIs in a second target long TTI is scheduled according to the short TTI scheduling information and the scheduled one or more short TTIs are sent to the second equipment; and HARQ feedback for each of the one or more short TTIs which is sequentially sent by the second equipment within the second target long TTI is received. The method provided in the present disclosure may effectively shorten the HARQ feedback latency of short TTIs and improve the flexibility of data transmission.

18 Claims, 10 Drawing Sheets

(56) References Cited

U.S. PATENT DOCUMENTS

| | | | |
|---|---|---|---|
| 2007/0245201 A1 | 10/2007 | Sammour et al. | |
| 2013/0039272 A1* | 2/2013 | Chen | H04W 76/25 |
| | | | 370/328 |
| 2016/0270100 A1 | 9/2016 | Ng et al. | |
| 2017/0303144 A1* | 10/2017 | Guo | H04W 74/0808 |
| 2017/0332397 A1* | 11/2017 | Li | H04L 1/1861 |
| 2018/0041325 A1* | 2/2018 | Lee | H04L 1/00 |
| 2018/0077719 A1* | 3/2018 | Nory | H04W 52/346 |
| 2018/0352570 A1* | 12/2018 | Sun | H04W 72/14 |
| 2018/0359751 A1* | 12/2018 | Ko | H04L 5/0053 |
| 2020/0170032 A1* | 5/2020 | Li | H04W 72/1268 |
| 2020/0275465 A1* | 8/2020 | Horiuchi | H04L 5/1469 |

FOREIGN PATENT DOCUMENTS

| | | |
|---|---|---|
| CN | 104468030 A | 3/2015 |
| CN | 104521281 A | 4/2015 |
| CN | 105873218 A | 8/2016 |
| EP | 2 228 937 A2 | 9/2010 |
| JP | 2007-336494 A | 12/2007 |
| JP | 2015-002411 A | 1/2015 |
| JP | 2018-523441 A | 8/2018 |
| RU | 2462823 C2 | 9/2012 |
| WO | WO 2013/112703 A2 | 8/2013 |
| WO | WO 2014/166214 A1 | 10/2014 |
| WO | WO 2016/029736 A1 | 3/2016 |
| WO | WO 2016/064049 A1 | 4/2016 |
| WO | WO 2016/106683 A1 | 7/2016 |
| WO | WO 2016/148454 A1 | 9/2016 |
| WO | WO 2017/132842 A1 | 8/2017 |

OTHER PUBLICATIONS

Office Action dated Mar. 21, 2019, in counterpart Chinese Application No. 201680001452.9 and English translation thereof.
Office Action dated Jun. 13, 2019, in counterpart Chinese Application No. 201680001452.9 and English translation thereof.
English translation of Written Opinion of the International Searching Authority of PCT Application No. PCT/CN2016/105728, dated Mar. 29, 2017, issued by the ISA/CN—State Intellectual Property Office of the P.R. China.
Extended Search Report for European Application No. 16921431.9 from the European Patent Office, dated Oct. 22, 2019.
Federal Service for Intellectual Property & Federal Institute of Industrial Property, Patent Search Report issued in Application No. 2019116807/08, dated Oct. 17, 2019.
Office Action Issued in European Application No. 16921431.9, dated Aug. 31, 2020.
Brazilian Office Action dated Sep. 15, 2020, in counterpart Brazilian Application No. BR112019009536-5.
Japanese Office Action dated Sep. 1, 2020, in counterpart Japanese Application No. 2019-524862.
Korean Office Action dated Jun. 24, 2020, in counterpart Korean Application No. 10-2019-7017137.
"Discussion on CA issues for shortened TTI operation", Huawei, HiSilicon, 3GPP TSG RAN WG1 Meeting #86bis, Lisbon, Portugal, Oct. 10-14, 2016.
"Low frequency assisted high frequency operation", Huawei, HiSilicon, 3GPP TSG RAN WG1 Meeing#86, Gothenburg, Sweden, Aug. 22-26, 2016.
Yasuaki Yuda et al., "A Study on Effect of Processing Time Reduction on Latency Reduction for LTB-Advanced Pro/NR", 2016 IEICE, Sep. 20-23, 2016.
Office Action Issued in Indian Application No. 201917021001, dated Jan. 29, 2021, 6 pages.

* cited by examiner

US 11,362,766 B2

METHOD AND APPARATUS FOR OBTAINING HARQ FEEDBACK AND METHOD AND APPARATUS FOR TRANSMITTING HARQ FEEDBACK

CROSS REFERENCE TO RELATED APPLICATIONS

This application is a national phase application based on PCT/CN2016/105728, filed Nov. 14, 2016, the content of which is incorporated herein by reference.

TECHNICAL FIELD

The present disclosure relates to the field of communication technologies, and in particular, to a method and an apparatus for obtaining HARQ feedback and a method and an apparatus for transmitting HARQ feedback.

TECHNICAL BACKGROUND

With the development of wireless communication technologies, the mobile communication network is gradually evolving to 5G network. The 5G network greatly improves the data transmission rate, coverage, latency, capacity and so on, and may be configured with more downlink services, such as enhanced mobile broadband band (eMBB), massive Machine Type Communication (mMTC), Ultra Reliable Low-latency Communication (URLLC) and so on, according to user requirements. The 5G network is applied in broadband connections, Internet of Things, Internet of Vehicles, wide area coverage and so on.

When data of an insensitive service, such as the mMTC service, is transmitted between two pieces of equipment, for example, a base station transmits the data of the mMTC service to user equipment, because the mMTC service is insensitive to latency, the data may be transmitted with a preset number of long TTIs (Transmission Time Intervals). The long TTI is a basic unit of the above insensitive service transmission and has a relatively long time period, such as 10 ms. In this process, according to the service requirements, if a latency-sensitive service using a short TTI to perform transmission is to be transmitted between the two equipment, the short TTI is also allowed to be scheduled in the above-mentioned long TTI.

According to the related art, since a HARQ (Hybrid Automatic Repeat Request) feedback resource corresponding to a long TTI has been configured, which is generally at a tail of the long TTI, as shown in FIG. 1-1. When a short TTI is scheduled in a long TTI, HARQ feedback of the short TTI 200 is transmitted only with the long TTI HARQ feedback resource 103, as shown in FIG. 1-2. Since a time period of the long TTI is greater than a time period of the short TTI, according to the transmission characteristics of the long TTI, HARQ feedback latency of the short TTI is increased. Therefore, the transmission time of the latency-sensitive data is increased and the resource of the long TTI is also wasted.

SUMMARY

To overcome the problems in the related art, examples of the present disclosure provide a method and an apparatus for obtaining HARQ feedback and a method and an apparatus for transmitting HARQ feedback. When two equipment interrupt the long time interval transmission and switch to the transmission of a short time interval service, HARQ feedback latency of the short time interval service is shortened.

According to a first aspect of examples of the present disclosure, a method of obtaining HARQ feedback is provided, which is applied in first equipment. The method includes:

configuring short transmission time interval (TTI) scheduling information into a first target long TTI according to service requirements, where the short TTI scheduling information includes at least location information, length information, quantity information and location information of HARQ feedback resource of a short TTI, the HARQ feedback resource of a short TTI is configured to send HARQ feedback of the short TTI to the first equipment from second equipment;

sending the short TTI scheduling information to the second equipment through the first target long TTI;

scheduling one or more short TTIs in a second target long TTI according to the short TTI scheduling information and sending the scheduled one or more short TTIs to the second equipment; and receiving HARQ feedback for each of the one or more short TTIs which is sequentially sent by the second equipment within the second target long TTI.

Optionally, configuring the short TTI scheduling information into the first target long TTI according to service requirements includes:

monitoring a low-latency service request when data is being transmitted through long TTIs; and in response to determining that the low-latency service request is monitored, configuring the short TTI scheduling information into the first target long TTI, where low-latency service data is to be transmitted in short TTIs.

Optionally, configuring the short TTI scheduling information into the first target long TTI includes:

configuring the short TTI scheduling information into a control signaling associated with the first target long TTI; or configuring the short TTI scheduling information into a data field associated with the first target long TTI and configuring location information of the short TTI scheduling information into a control signaling associated with the first target long TTI, where the location information of the short TTI scheduling information is used to indicate a storage location of the short TTI scheduling information in the data field associated with the current long TTI.

Optionally, configuring the short TTI scheduling information into the control signaling associated with the first target long TTI includes:

configuring scheduling information of all short TTIs in a long TTI into the control signaling associated with the first target long TTI; or configuring scheduling information of a first short TTI in a long TTI into the control signaling associated with the first target long TTI, where the scheduling information of the first short TTI further includes indication information to indicate that the first short TTI includes scheduling information of a subsequent short TTI.

Optionally, when the first target long TTI is configured with scheduling information of all short TTIs in a long TTI, scheduling the one or more short TTIs in the second target long TTI according to the short TTI scheduling information includes:

according to the scheduling information, sequentially scheduling each of the one or more short TTIs within the second target long TTI and sequentially allocating a HARQ feedback resource for each of the one or more short TTIs.

Optionally, when a control signaling associated with the first target long TTI includes scheduling information of a first short TTI in a long TTI, scheduling the one or more short TTIs in the second target long TTI according to the short TTI scheduling information includes:

according to the scheduling information of the first short TTI, scheduling the first short TTI in the second target long TTI; and allocating a HARQ feedback resource for the first short TTI;

for the first short TTI to a penultimate short TTI, sequentially performing following operations:

configuring scheduling information of a subsequent short TTI into a sub-control signaling associated with a current short TTI; where the scheduling information of the subsequent short TTI includes at least length information, location information of HARQ feedback resource and indication information; and according to the scheduling information of the subsequent short TTI, scheduling the subsequent short TTI, and allocating a HARQ feedback resource for the subsequent short TTI.

Optionally, configuring the location information of HARQ feedback resource of a short TTI into the first target long TTI includes:

configuring a HARQ feedback resource of a short TTI to be immediately adjacent to a tail of the short TTI; and when a long TTI has redundant resources after one or more short TTIs are scheduled in the long TTI, allocating an original HARQ feedback resource configured for the long TTI to a last one of the one or more short TTIs.

According to a second aspect of examples of the present disclosure, a method of transmitting HARQ feedback is provided, which is applied in second equipment. The method includes:

obtaining short TTI scheduling information from a first target long TTI, where the short TTI scheduling information includes at least location information, length information, quantity information and location information of HARQ feedback resource of a short TTI, the HARQ feedback resource of a short TTI is configured to transmit HARQ feedback of the short TTI to first equipment from the second equipment;

according to the short TTI scheduling information, sequentially analyzing each of short TTIs from a second target long TTI; and transmitting HARQ feedback to the first equipment through a HARQ feedback resource of each of the short TTIs.

Optionally, obtaining the short TTI scheduling information from the first target long TTI includes:

monitoring whether each of long TTIs includes the short TTI scheduling information to obtain a monitoring result;

determining a current long TTI as the first target long TTI when the monitoring result indicates that the current long TTI includes the short TTI scheduling information; and analyzing the short TTI scheduling information from the first target long TTI.

Optionally, according to the scheduling information, sequentially analyzing each of short TTIs from the second target long TTI and transmitting the HARQ feedback to the first equipment through the HARQ feedback resource of each of the short TTIs includes: determining the second target long TTI which is scheduled with the short TTIs according to the location information of the short TTIs;

obtaining each of the short TTIs in the second target long TTI according to the length information and the quantity information of the short TTIs;

performing error detection on a data packet of each of the short TTIs to generate HARQ feedback corresponding to the short TTI; and transmitting the HARQ feedback of each of the short TTIs to the first equipment through a corresponding HARQ feedback resource according to the location information of the HARQ feedback resource.

Optionally, obtaining each of the short TTIs from the second target long TTI according to the length information and the quantity information of the short TTIs includes:

when the quantity information indicates 1, obtaining a first short TTI in the second target long TTI according to the length information; and from the first short TTI, sequentially performing following operations:

determining whether scheduling information of a current short TTI includes indication information, where the indication information is used to indicate that the current short TTI includes scheduling information of a subsequent short TTI;

in response to determining that the current short TTI includes the indication information, analyzing the scheduling information of the subsequent short TTI from the obtained current short TTI, and analyzing the subsequent short TTI from the second target long TTI according to the scheduling information of the subsequent short TTI; and in response to determining that the current short TTI does not include the indication information, stopping analyzing the short TTI from the second target long TTI.

According to third aspect of examples of the present disclosure, an apparatus for obtaining HARQ feedback is provided, which is applied in first equipment. The apparatus includes:

a configuring module, to configure short TTI scheduling information into a first target long TTI according to service requirements, where the short TTI scheduling information includes at least location information, length information, quantity information and location information of HARQ feedback resource of a short TTI, the HARQ feedback resource of a short TTI is configured to send HARQ feedback of the short TTI to the first equipment from second equipment;

a scheduling information sending module, to send the short TTI scheduling information to the second equipment through the first target long TTI;

a scheduling module, to schedule one or more short TTIs in a second target long TTI according to the short TTI scheduling information and send the scheduled one or more short TTIs to the second equipment; and a receiving module, to receive HARQ feedback for each of the one or more short TTIs which is sequentially sent by the second equipment within the second target long TTI.

Optionally, the configuring module includes:

a monitoring sub-module, to monitor a low-latency service request when data is being transmitted through long TTIs; and a scheduling information configuring sub-module, to configure the short TTI scheduling information into the first target long TTI in response to determining that the low-latency service request is monitored, where low-latency service data is to be transmitted in short TTIs.

Optionally, the scheduling information configuring sub-module includes:

a first configuring unit, to configure the short TTI scheduling information into a control signaling associated with the first target long TTI; or a second configuring unit, to configure the short TTI scheduling information into a data field associated with the first target long TTI and configure location information of the short TTI scheduling information into a control signaling associated with the first target long TTI, where the location information of the short TTI scheduling information is used to indicate a storage location of the short TTI scheduling information in the data field associated with current long TTI.

Optionally, the first configuring unit includes:

a first configuring sub-unit, to configure scheduling information of all short TTIs in a long TTI into the control signaling associated with the first target long TTI; or a second configuring sub-unit, to configure scheduling information of a first short TTI in a long TTI into the control signaling associated with the first target long TTI, where the scheduling information of the first short TTI further includes indication information to indicate that the first short TTI includes scheduling information of a subsequent short TTI.

Optionally, the scheduling module includes:

a first scheduling sub-module, to when the first target long TTI is configured with scheduling information of all short TTIs in a long TTI, according to the scheduling information, sequentially schedule each of the one or more short TTIs within the second target long TTI and sequentially allocate a HARQ feedback resource for each of the one or more short TTIs.

Optionally, the scheduling module includes:

a second scheduling sub-module, to when a control signaling associated with the first target long TTI includes scheduling information of a first short TTI in a long TTI, according to the scheduling information of the first short TTI, schedule the first short TTI in the second target long TTI and allocate a HARQ feedback resource for the first short TTI; and a third scheduling sub-module, to sequentially trigger a nested configuring unit and a scheduling unit from the first short TTI to a second last short TTI; where the nested configuring unit is to configure scheduling information of a subsequent short TTI into a sub-control signaling associated with a current short TTI; where the scheduling information of the subsequent short TTI includes at least length information, location information of HARQ feedback resource and indication information; and the scheduling unit is to schedule the subsequent short TTI and allocate a HARQ feedback resource for the subsequent short TTI according to the scheduling information of the subsequent short TTI.

Optionally, the configuring module includes:

a first resource configuring sub-module, to configure a HARQ feedback resource of a short TTI to be immediately adjacent to a tail of the short TTI; or a second resource configuring sub-module, to an original HARQ feedback resource configured for the long TTI to a last one of the one or more short TTIs. when the long TTI has redundant resources after one or more short TTIs are scheduled in the long TTI.

According to a fourth aspect of the present disclosure, an apparatus for transmitting HARQ feedback is provided, which is applied in second equipment. The apparatus includes:

a scheduling information obtaining module, to obtain short TTI scheduling information from a first target long TTI, where the short TTI scheduling information includes at least location information, length information, quantity information and location information of HARQ feedback resource of a short TTI, the HARQ feedback resource of a short TTI is configured to transmit HARQ feedback of the short TTI to first equipment from the second equipment; and a feedback sending module, to sequentially analyze each of short TTIs from a second target long TTI and send HARQ feedback to the first equipment through a HARQ feedback resource of each of the short TTIs according to the short TTI scheduling information.

Optionally, the scheduling information obtaining module includes:

a monitoring sub-module, to monitor whether each of long TTIs includes the short TTI scheduling information to obtain a monitoring result;

a first target determining sub-module, to determine a current long TTI as the first target long TTI when the monitoring result indicates that the current long TTI includes the short TTI scheduling information; and an analyzing sub-module, to analyze the short TTI scheduling information from the first target long TTI.

Optionally, the feedback sending module includes:

a second target determining sub-module, to determine the second target long TTI which is scheduled with the short TTIs according to the location information of the short TTIs;

a short TTI obtaining sub-module, to obtain each of the short TTIs in the second target long TTI according to the length information and the quantity information of the short TTIs;

a detecting sub-module, to perform error detection on a data packet of each of the short TTIs to generate HARQ feedback corresponding to the short TTI; and a sending sub-module, to transmit the HARQ feedback of each of the short TTIs to the first equipment through a corresponding HARQ feedback resource according to the location information of the HARQ feedback resource.

Optionally, the short TTI obtaining sub-module includes:

a first short TTI obtaining unit, to obtain a first short TTI in the second target long TTI according to the length information when the quantity information indicates 1; and a polling executing unit, to sequentially trigger a determining sub-unit, a polling scheduling sub-unit or a termination executing sub-unit starting from the first short TTI;

where the determining sub-unit is to determine whether scheduling information of a current short TTI includes indication information, where the indication information is used to indicate that the current short TTI includes scheduling information of a subsequent short TTI;

where the polling scheduling sub-unit is to, in response to determining that the current short TTI includes the indication information, analyze the scheduling information of the subsequent short TTI from the obtained current short TTI and analyze the subsequent short TTI from the second target long TTI according to the scheduling information of the subsequent short TTI; and where the termination executing sub-unit is to, in response to determining that the current short TTI does not include the indication information, stop analyzing the short TTI from the second target long TTI.

According to a fifth aspect of examples of the present disclosure, an apparatus for obtaining HARQ feedback is provided, which includes:

a processor;

a memory to store instructions executable by the processor;

where the processor is configured to:

configure short TTI scheduling information into a first target long TTI according to service requirements, where the short TTI scheduling information includes at least location information, length information, quantity information and location information of HARQ feedback resource of a short TTI, the HARQ feedback resource of a short TTI is configured to send HARQ feedback of the short TTI to the first equipment from second equipment;

send the short TTI scheduling information to the second equipment through the first target long TTI;

schedule one or more short TTIs in a second target long TTI according to the short TTI scheduling information and send the scheduled one or more short TTIs to the second equipment; and receive HARQ feedback for each of the one or more short TTIs which is sequentially sent by the second equipment within the second target long TTI.

According to a sixth aspect of examples of the present disclosure, an apparatus for transmitting HARQ feedback is provided, which includes:

a processor;

a memory to store instructions executable by the processor;

where the processor is configured to:

obtain short TTI scheduling information from a first target long TTI, where the short TTI scheduling information includes at least location information, length information, quantity information and location information of HARQ feedback resource of a short TTI, the HARQ feedback resource of a short TTI is configured to transmit HARQ feedback of the short TTI to first equipment from the second equipment;

according to the short TTI scheduling information, sequentially analyze each of short TTIs from a second target long TTI; and transmit HARQ feedback to the first equipment through a HARQ feedback resource of each of the short TTIs.

The technical scheme provided in embodiments of the present disclosure may include the following beneficial effects:

In examples of the present disclosure, when the first equipment transmits service data to the second with long TTIs, if a latency-sensitive service request is received, the first equipment may interrupt the transmission of the service data in a preset long TTI, schedule a short TTI to transmit a latency-sensitive request in the long TTI, and allocate a HARQ feedback resource for each short TTI in the long TTI, so that the short TTI service data is sent to the second equipment in time, and the HARQ feedback of each short TTI sent by the second equipment is received in time. The HARQ feedback latency of short TTIs is shortened and the flexibility of data transmission is improved.

In examples of the present disclosure, the first equipment monitors a low-latency service request in real time when long TTIs are used to transmit data, and configures short TTI scheduling information in a first target long TTI, when the low-latency service request is monitored. The short TTI is used to transmit low-latency service data. In this way, the response sensitivity to the low-latency service request is enhanced.

In examples of the present disclosure, the first equipment may configure the short TTI scheduling information into a control signaling associated with one long TTI, so as to facilitate that the second equipment quickly obtains the short TTI scheduling information, thereby improving the analyzing efficiency of short TTIs. Alternatively, the first equipment configures the short TTI scheduling information into a data field associated with one long TTI, so as to reduce the interference of data transmission to the short TTI scheduling information and improve the signal to noise ratio of channel transmission.

In the present disclosure, the first equipment may configure scheduling information of all short TTIs to be scheduled in one long TTI into a control signaling associated with a long TTI, so as to improve the scheduling efficiency of short TTIs. The first equipment may also configure scheduling information in a nested manner such that the scheduling information of a subsequent short TTI is configured in a current short TTI, so as to increase configuration flexibility.

In examples of the present disclosure, when scheduling information of all short TTIs in a long TTI is configured into the first target long TTI, the first equipment may complete the scheduling of the all short TTIs according to the scheduling information, and thus the scheduling efficiency of the short TTIs is improved, thereby shortening the transmission latency of the second target long TTI.

In examples of the present disclosure, when a control signaling associated with the first target long TTI includes scheduling information of the first short TTI in a long TTI, the base station may first schedule the first short TTI to the second target long TTI, configure scheduling information of the second short TTI in the first short TTI and schedule the second short TTI. In this way, the scheduling information of a subsequent short TTI is configured while scheduling the current short TTI, the flexibility to schedule short TTIs is improved, and the resources of the second target long TTI are fully utilized based on the service requirements so to reduce resource waste.

In examples of the present disclosure, for each of short TTIs, a HARQ feedback resource of the short TTI is configured be immediately adjacent to a tail of the short TTI, so that the second equipment may send the HARQ feedback of the short TTI to the first equipment through the HARQ feedback resource in real time after receiving the short TTI, so as to reduce the HARQ feedback latency of the short TTI. When a long TTI has redundant resources after one or more short TTIs are scheduled, the last short TTI is allocated with an original HARQ feedback resource configured for the long TTI. In this way, the original HARQ feedback resource configured for the long TTI are effectively utilized, the complexity of the system is reduced.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 1-2 is a schematic diagram of a structure of a long TTI according to an example of the present disclosure.

FIG. 2 is a flowchart of a method of obtaining HARQ feedback according to an example of the present disclosure.

FIG. 3-1 is a schematic diagram of a structure of a long TTI according to an example of the present disclosure.

FIG. 3-2 is a schematic diagram of a structure of another long TTI according to an example of the present disclosure.

FIG. 3-3 is a schematic diagram of a structure of another long TTI according to an example of the present disclosure.

DETAILED DESCRIPTION OF THE EMBODIMENTS

Figure 1:
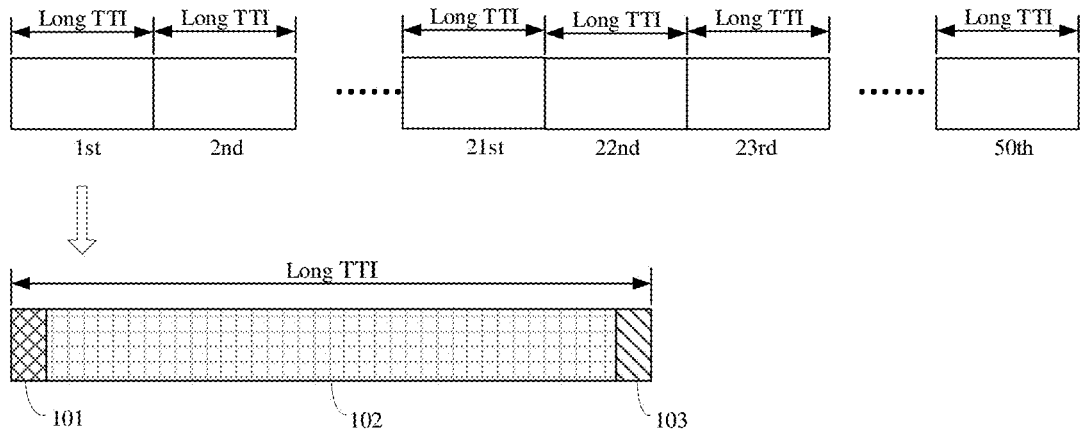
FIG. 1-1 is a schematic diagram of a structure of a long TTI in related art according to an example.

Examples will be described in detail here with the examples thereof expressed in the drawings. Where the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The term used in the present disclosure is for the purpose of describing particular examples only and is not intended to limit the present disclosure. As used in this disclosure and the appended claims, the singular forms "a", "an" and "the" are intended to include the plural forms as well, unless the context clearly indicates otherwise. It should also be understood that the term "and/or" as used herein refers to and includes any and all possible combinations of one or more of the associated listed items.

It shall be understood that, although the terms "first," "second," "third," and the like may be used herein to describe various information, the information should not be limited by these terms. These terms are only used to distinguish one category of information from another. For example, without departing from the scope of the present disclosure, first information may be referred as second information; and similarly, second information may also be referred as first information. As used herein, the term "if" may be interpreted as "when" or "upon" or "in response to determining" depending on the context.

First, first equipment and second equipment involved in the present disclosure may be a base station, a sub base station, user equipment, and the like. The user equipment (UE) may be equipment having a mobile communication function, such as a user terminal, a user node, a mobile terminal, a tablet computer, or the like. The above equipment applies to a 5G cellular communication system.

A HARQ mechanism of the present disclosure is described. In the HARQ transmission mechanism, after transmitting downlink service data to the second equipment with a preset TTI, the first equipment pauses and waits to receive HARQ feedback sent by the second equipment. The second equipment performs error detection on each received service data packet. If the receipt is correct, an acknowledgment ACK signal is generated; and if the receipt error occurs, a negative-acknowledgment NACK signal is generated. The second equipment returns the HARQ feedback to the first equipment through a specified HARQ feedback resource. If the ACK signal is received, the first equipment transmits a new downlink service data packet to the second equipment. If the NACK signal is received, the first equipment re-transmits the last transmitted service data packet to the second equipment.

In an exemplary application scenario of the present disclosure, first equipment receives a service request for obtaining a latency-sensitive service, such as URLLC service sent by second equipment during the first equipment transmitting latency-insensitive service data, such as the mMTC service data, to the second equipment with long TTIs. In this case, the first equipment interrupts the transmission of the mMTC service data and schedules at least one short TTI in at least one of the long TTIs, such that the first equipment transmits the URLLC service data carried by the short TTI to the second equipment in time, and it is ensured that the first equipment may quickly obtain the HARQ feedback of the short TTI. The length of a long TTI is greater than the length of a short TTI. A length of a TTI may also be referred to as a time period. For example, the length of the long TTI is 10 ms, and the length of a short TTI may be 1 ms, 2 ms, 4 ms, or the like.

Based on this, the present disclosure provides a method of obtaining HARQ feedback, which is applied to the first equipment. FIG. 2 is a flowchart of a method of obtaining HARQ feedback according to an example. The method may include:

At step 11, short TTI scheduling information is configured into a first target long TTI according to user requirements, where the scheduling information includes at least location information, length information, quantity information and location information of HARQ feedback resource of a short TTI. The second equipment sends HARQ feedback of a short TTI to the first equipment through the HARQ feedback resource of the short TTI.

In the present disclosure, the first equipment configures the short TTI scheduling information into the first target long TTI. According to the scheduling information, the first equipment may know how to schedule the short TTI in the preset long TTI. After obtaining the short TTI scheduling information, the second equipment may know how to receive and process the short TTIs.

Figures 1, 2:
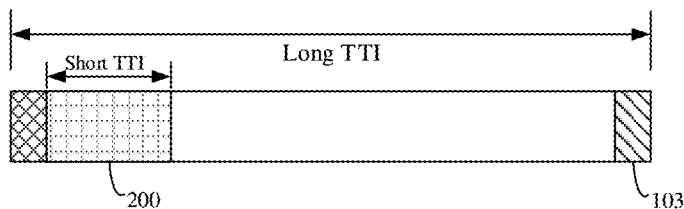
Figure 2:
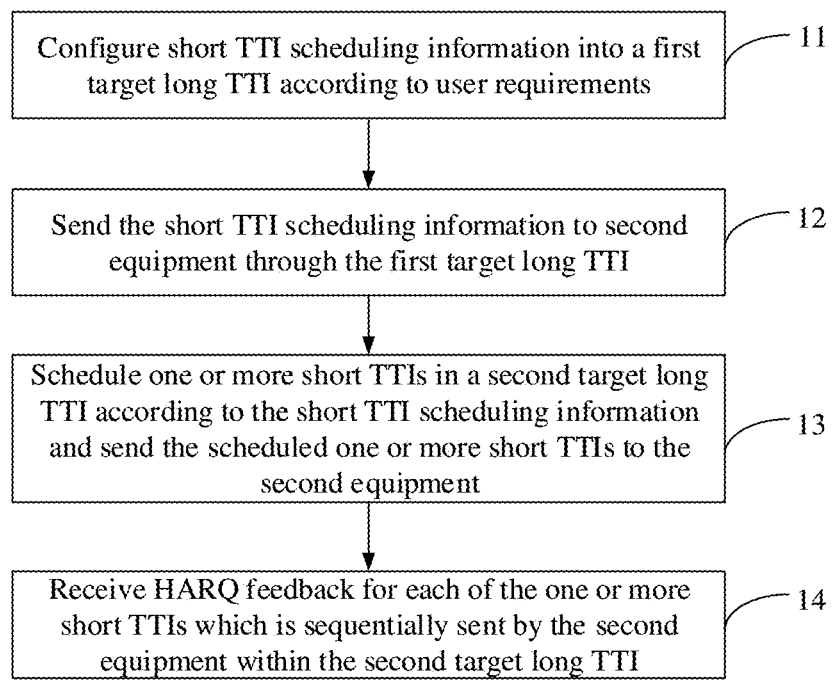

According to the above application scenario and in conjunction with FIG. 1-1, when the first equipment prepares to schedule a $22^{nd}$ long TTI to transmit mMTC service data, a service request information which is obtaining URLLC service data is received from the second equipment. At this time, the first equipment temporarily interrupts the transmission of the mMTC service data, and configures short TTI scheduling information into the $22^{nd}$ long TTI. The $22^{nd}$ long TTI is the first target long TTI in the present disclosure. That is, the short TTI scheduling information is configured into the first target long TTI. The first equipment may send the short TTI scheduling information to the second equipment through the first target long TTI.

In the present disclosure, the short TTI scheduling information configured by the first equipment includes at least location information, length information and quantity information and location information of HARQ feedback resource of a short TTI.

The location information of a short TTI is used to indicate a long TTI which is to be scheduled with the short TTI, and the location information may be: the serial number of the long TTI, such as serial number $23^{rd}$; or a position offset value of the long TTI, that is, the position offset value of the long TTI scheduled with the short TTI with respect to the current long TTI. As described above, the short TTI scheduling information is currently configured into the $22^{nd}$ long TTI, and if it is specified that the short TTI is to be scheduled into the $23^{rd}$ long TTI, the above-mentioned position offset value is 1. The above describes a case where the short TTI is scheduled in a subsequent long TTI with a delay. In an example of the present disclosure, the location information of the short TTI may be used to indicate that the short TTI is to be scheduled in the current long TTI. For this case, the location information of the above TTI may be expressed as serial number $22^{nd}$ or the position offset value being zero.

The length information of a short TTI indicates the length of the short TTI to be scheduled. In an example of the present disclosure, a plurality of short TTIs with the same length, such as 1 ms, may be scheduled in a long TTI. When the length of the short TTI is equal to 1/integer of the length of the long TTI, for example, the length information may be expressed as 10 ms/N, where the integer N is a natural number greater than one. In another example of the present disclosure, short TTIs with different lengths may be scheduled in the long TTI. For example, the short TTIs to be scheduled are classified into three categories according to a correspondence between the category and length of the short TTI, as shown in Table 1:

TABLE 1

| Category of short TTI | Length |
|---|---|
| First category | 1 ms |
| Second category | 2 ms |
| Third category | 4 ms |

The quantity information of short TTIs indicates the quantity of short TTIs to be scheduled in the long TTI. When the lengths of short TTIs to be scheduled are the same, the quantity information may indicate an integer N, such as 2. For example, if the length information may be expressed as 10 ms/$2^n$, the quantity information may be expressed as $2^n$, or only the index n of 2, where n is a natural number greater than or equal to 1. In this way, the amount of data of the scheduling information is reduced as much as possible, and the signaling overhead is reduced.

When the lengths of the short TTIs to be scheduled are different, a short TTI quantity list may be used to record a correspondence between a category and/or length and quantity of short TTIs. For example, when the short TTI quantity list records the correspondence between category and quantity of short TTIs, the short TTI quantity list may be as shown in Table 2:

TABLE 2

| Category of short TTI | Quantity |
|---|---|
| First category | 1 |
| Second category | 1 |
| Third category | 1 |

When configuring the quantity, the length information of each of short TTIs to be scheduled is considered so that the sum of the lengths of all short TTIs to be scheduled does not exceed the length of one long TTI. As shown in Table 2, the sum of the lengths of all the short TTIs to be scheduled being 1 ms×1+2 ms×1+4 ms×1=7 ms is less than the length 10 ms of one long TTI.

The location information of HARQ feedback resource of a short TTI is used to indicate which part associated with the short TTI is configured with a HARQ feedback resource.

In an example of the present disclosure, each short TTI is configured with a corresponding HARQ feedback resource. In the present disclosure, the HARQ feedback resource of a short TTI may be configured in at least two manners:

In the first manner, for each short TTI, the HARQ feedback resource of the short TTI is configured to be immediately adjacent to a tail of the short TTI.

Figures 1, 3:
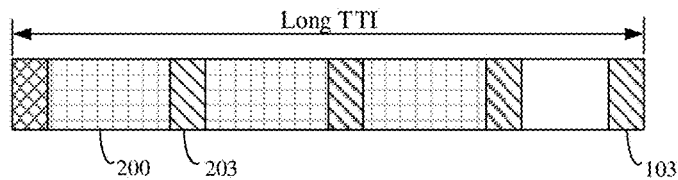
Figures 2, 3:
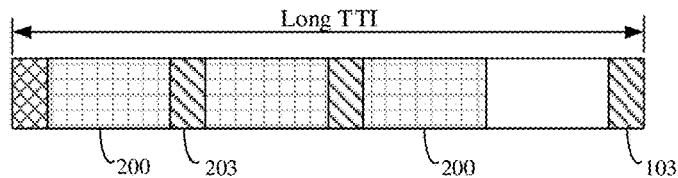
Figure 3:
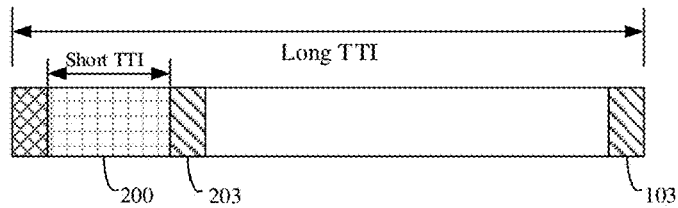

FIG. 3-1 is a schematic diagram of a structure of a target long TTI after short TTIs are scheduled. In an example, the HARQ feedback resource 203 corresponding to the short TTI 200 may be configured at the tail of the short TTI 200. That is, the tail of each of short TTIs 200 is immediately adjacent one HARQ feedback resource 203.

In an example of the present disclosure, when a long TTI has redundant resources (corresponding to blank in the FIG. 3-1) after one or more short TTIs are scheduled, in one case, the redundant resources are no longer used to improve the short TTI transmission efficiency. In another case, the above redundant resources may be used to continue scheduling latency-insensitive data to avoid resource waste. It is assumed that there are 9 ms remaining resources after a short TTI of 1 ms is scheduled in a long TTI of 10 ms, and assuming that the data originally allocated to the long TTI is 1-10, the data 1-9 may be transmitted with the above redundant resources.

In the second manner, when a long TTI has redundant resources after one or more short TTIs are scheduled, the last short TTI is specified to use an original HARQ feedback resource configured for the long TTI.

FIG. 3-2 is a schematic diagram of a structure of another target long TTI after short TTIs are scheduled. After three short TTIs 200 are scheduled in one long TTI, less redundant resources (corresponding to blank in the FIG. 3-2) remain. The original HARQ feedback resource 103 configured for the long TTI may be specified as the HARQ feedback resource of the third short TTI. Therefore, the validity of the original HARQ feedback resource configured for the long TTI is retained, the number of the configured HARQ feedback resource in one long TTI is reduced, and the complexity of the system is reduced.

Figure 4:
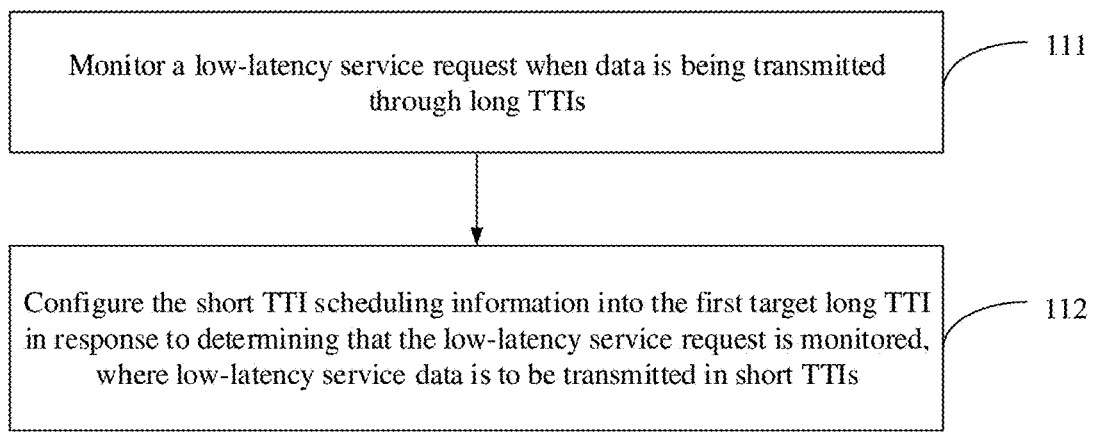
FIG. 4 is a flowchart of another method of obtaining HARQ feedback according to an example of the present disclosure.

FIG. 4 is a flowchart of another method of obtaining HARQ feedback according to an example. The above step 11 may include:

At step 111, when long TTIs are used to transmit data, a low-latency service request is monitored.

In the scenario shown in FIG. 1-1, the first equipment is originally configured with 50 long TTIs for transmitting mMTC service data to the second equipment. When the first equipment uses the long TTIs to send the mMTC service data, a service request sent by the second equipment is simultaneously monitored. The first equipment determines whether the monitored service request belongs to a low-latency service request according to the monitored service request. If yes, the following step 112 is performed; and if no, the monitored service request may not be processed or may be delay processed, for example, after the above 50 long TTI transmissions are completed, the monitored service request is processed.

At step 112, in response to determining that the low-latency service request is monitored, the short TTI scheduling information is configured into the first target long TTI, where the low-latency service data is to be transmitted with short TTI.

As shown in FIG. 1-1, when the first equipment sent the first 21 long TTIs and is about to send the $22^{nd}$ long TTI, the low-latency service request, such as a URLLC service request, is monitored. Then the first equipment interrupts the transmission of mMTC service data and preferably configures the short TTI scheduling information into the $22^{nd}$ long TTI.

In examples of the present disclosure, regarding which part associated with the long TTI is to be configured with the short TTI scheduling information, the following two cases may be included.

In the first case, the short TTI scheduling information is configured into a control signaling associated with the first target long TTI.

As shown in the schematic diagram of the structure of the long TTI shown in FIG. 1-1, the short TTI scheduling information may be configured into the control signaling 101 located in the header of the $22^{nd}$ long TTI, which is applicable for transmitting the control signaling carried by a Physical Downlink Control Channel (PDCCH).

In examples of the present disclosure, according to the quantity of short TTIs corresponding to the scheduling information, there are two manners to configure the scheduling information.

In the first configuring manner, the scheduling information of all short TTIs to be scheduled in a long TTI is configured into the control signaling associated with the first target long TTI.

Take a second target long TTI being the $23^{rd}$ long TTI in FIG. 1-1 as an example. It is assumed that three short TTIs are to be scheduled in the $23^{rd}$ long TTI, and the length of each of the three short TTIs is same, which is assumed to be 1 ms. The HARQ feedback resource of each short TTI is immediately adjacent to the tail of the short TTI. At this case, the short TTI scheduling information configured into the control signaling 101 of the $22^{nd}$ long TTI may include: the location information indicating the $23^{rd}$ long TTI; the length information being 1 ms; the quantity information indicating 3; the location information of HARQ feedback resource indicating immediately adjacent to the tail of each short TTI.

In another example of the present disclosure, the short TTI scheduling information may also be in the form of a first scheduling information list and configured into the control signaling 101 associated with the $22^{nd}$ long TTI, as shown in Table 3 below:

TABLE 3

| | |
|---|---|
| Location information | $23^{rd}$ long TTI |
| Length information | 1 ms |
| Quantity information | 3 |
| Location information of HARQ feedback resource | Immediately adjacent to the tail of each short TTI |

In the second configuring manner, scheduling information of the first short TTI in a long TTI is configured into the control signaling associated with the first target long TTI, and scheduling information of a subsequent short TTI is configured in a sub-control signaling associated with a short TTI immediately before the subsequent short TTI in the second target long TTI.

Take the second target long TTI being the $23^{rd}$ long TTI in FIG. 1-1 as an example. It is assumed that three short TTIs are to be scheduled in the $23^{rd}$ long TTI and the length of each of the three short TTIs is same, which is assumed to be 1 ms. The HARQ feedback resource of each short TTI is immediately adjacent to the tail of the short TTI.

In the present disclosure, the scheduling information of the first short TTI in the $23^{rd}$ long TTI may be configured into the control signaling associated with the $22^{nd}$ long TTI, and in addition to the location information of the first short TTI, i.e., the $23^{rd}$ long TTI, the length information of the first short TTI, the quantity information of the first short TTI and the location information of HARQ feedback resource of the first short TTI, the scheduling information of the first short TTI further includes indication information. The indication information is used to indicate that the first short TTI includes the scheduling information of a subsequent short TTI. More specifically, the indication information is used to indicate that the sub-control signaling associated with the first short TTI includes the scheduling information of the subsequent short TTI.

For example, the scheduling information of the first short TTI configured into the control signaling 101 associated with the $22^{nd}$ long TTI may be recorded in a second scheduling information list, as shown in Table 4:

TABLE 4

| | |
|---|---|
| Location information | $23^{rd}$ long TTI |
| Length information | 1 ms |
| Quantity information | 1 |
| Location information of HARQ feedback resource | Immediately adjacent to the tail of the short TTI |
| Indication information | Y |

As shown in Table 4, the indication information Y indicates that the first short TTI in the $23^{rd}$ long TTI includes the scheduling information of the second short TTI.

In the second case, the short TTI scheduling information is configured into a data field associated with the first target long TTI, and location information of the short TTI scheduling information is configured into the control signaling associated with the first target long TTI. The location information is used to indicate a storage location of the short TTI scheduling information in the data field associated with the current long TTI. It is applicable to a case where control information is carried by an enhanced Physical Downlink Control Channel (ePDCCH).

Based on the schematic diagram of a structure of the long TTI shown in FIG. 1-1, the first equipment may also configure the short TTI scheduling information into the data field 102 associated with the $22^{nd}$ long TTI. In this case, the control signaling 101 of the $22^{nd}$ long TTI also needs to be configured with the location information of the short TTI scheduling information which is used to indicate the storage location of the short TTI scheduling information in the data field 102. Similar to the configuring manners to configure scheduling information in the first case, the second case may also use the two configuring manners to configure scheduling information of one or more short TTIs in the data field associated with a long TTI, and further details are omitted.

At step 12, the short TTI scheduling information is sent to the second equipment through the first target long TTI.

Correspondingly, the second equipment receives the first target long TTI and obtains the short TTI scheduling information from the first target long TTI. In this way, when the second equipment subsequently receives the second target long TTI scheduled with the short TTI, the second equipment obtains the short TTI from the second target long TTI according to the short TTI scheduling information, and sends the HARQ feedback corresponding to the short TTI to the first equipment.

At step 13, one or more short TTIs are scheduled in a second target long TTI according to the short TTI scheduling information and the scheduled one or more short TTIs are sent to the second equipment through the second target long TTI.

It should be noted that, in an example, the first target long TTI and the second target long TTI may be the same long TTI. In another example, the second target long TTI may also be a long TTI after the first target long TTI.

The step 13 specifically includes: sequentially scheduling short TTIs within the second target long TTI according to the short TTI scheduling information; sequentially allocating a HARQ feedback resource for each of the short TTIs; and sending the second target long TTIs scheduled with the short TTIs to the second equipment.

Corresponding to the two configuring manners for the short TTI scheduling information, the step 13 may also include at least two implementation manners to schedule a short TTI.

In the first scheduling manner, when scheduling information of all short TTIs in a long TTI is configured into the first target long TTI, for example, in the first configuring manner, the first equipment sequentially schedules each short TTI within a second target TTI and sequentially allocates the HARQ feedback resource for each short TTI according to the scheduling information. FIG. 3-1 is an exemplary schematic diagram of a structure of the $23^{rd}$ long TTI after three short TTIs are scheduled in the $23^{rd}$ long TTI according to the scheduling information in the above Table 3. According to the location difference of the HARQ feedback resource of the third short TTI configured in the scheduling information, FIG. 3-2 is an exemplary schematic diagram of another structure of the $23^{rd}$ long TTI after three short TTIs are scheduled in the $23^{rd}$ long TTI. FIG. 3-3 is an exemplary schematic diagram of a structure of a long TTI after one short TTI is scheduled in the long TTI.

Figure 5:
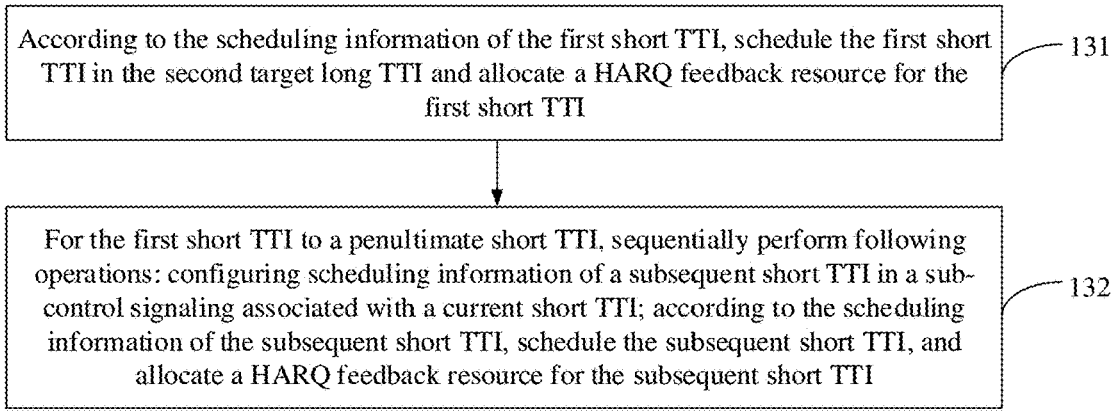
FIG. 5 is a flowchart of another method of obtaining HARQ feedback according to an example of the present disclosure.

In the second scheduling manner, when only scheduling information of the first short TTI in a long TTI is configured into the first target long TTI, FIG. 5 is a flowchart of another method of obtaining HARQ feedback according to an example. The above step 13 may include:

At step 131, according to the scheduling information of the first short TTI, the first short TTI is scheduled for the second target long TTI and a HARQ feedback resource is allocated for the first short TTI.

At step 132, for the first short TTI to a penultimate short TTI, following operations are sequentially performed: configuring scheduling information of a subsequent short TTI in a sub-control signaling associated with a current short TTI; and according to the scheduling information of the subsequent short TTI, scheduling the subsequent short TTI and allocating a HARQ feedback resource for the subsequent short TTI.

The scheduling information of the subsequent short TTI includes at least length information, location information of HARQ feedback resource and indication information.

Figure 6:
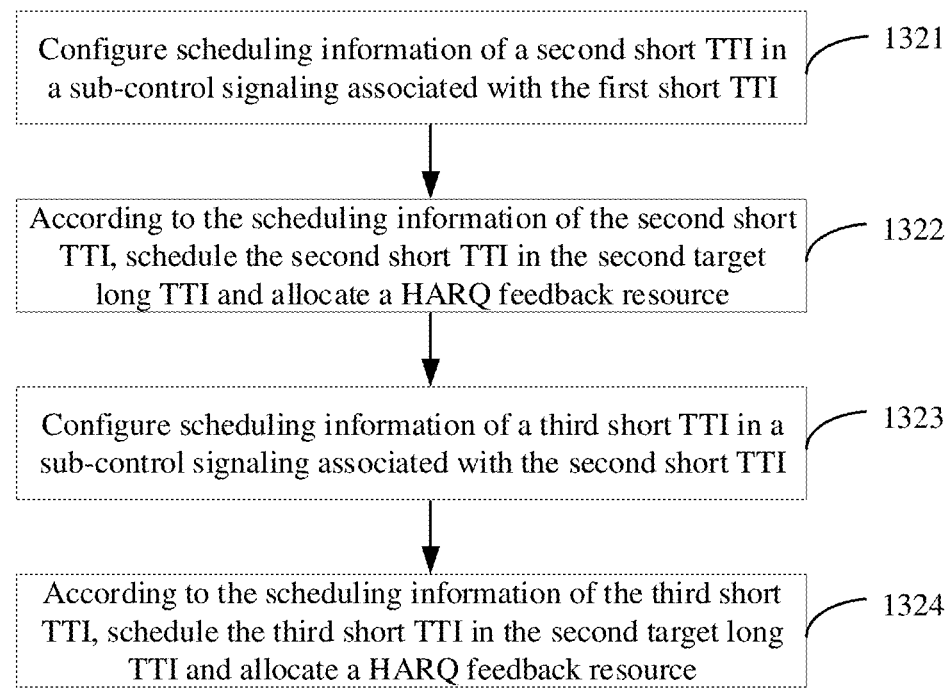
FIG. 6 is a flowchart of another method of obtaining HARQ feedback according to an example of the present disclosure.

For example, take a case that three short TTIs are to be scheduled in one long TTI as an example, and the scheduling information of the first short TTI is as shown in above Table 4. FIG. 6 is a flowchart of another method of obtaining HARQ feedback according to an example. The above step 132 may specifically include:

At step 1321, scheduling information of the second short TTI is configured in a sub-control signaling associated with the first short TTI.

As shown above, after the first equipment scheduled the first short TTI in the $23^{rd}$ long TTI according to the scheduling information shown in Table 4, the first equipment may configure the scheduling information of the second short TTI in the sub-control signaling associated with the first short TTI.

The scheduling information of the second short TTI may be the same as the information shown in Table 4, or the location information and the quantity information are omitted, as shown in Table 5:

TABLE 5

| | |
|---|---|
| Length information | 1 ms |
| Location information of HARQ feedback resource | Immediately adjacent to the tail of the short TTI |
| Indication information | Y |

Compared with Table 4, in Table 5, the data volume of the scheduling information is reduced, and thus the data volume of the sub-control signaling may be reduced, thereby saving channel transmission resources.

At step 1322, the second short TTI is scheduled in the second target long TTI and a HARQ feedback resource is allocated according to the scheduling information of the second short TTI.

At step 1323, scheduling information of the third short TTI is configured in a sub-control signaling associated with the second short TTI.

For example, the scheduling information of the third short TTI may be as shown in Table 6:

TABLE 6

| | |
|---|---|
| Length information | 1 ms |
| Location information of HARQ feedback resource | Immediately adjacent to the tail of the short TTI |

Compared with Table 5, the Table 6 does not include the indication information, which indicates that the third short TTI does not include scheduling information of a subsequent short TTI. That is, after the first equipment scheduled the third short TTI in the second target long TTI, other short TTIs are no longer scheduled in this second target long TTI.

At step 1324, the third short TTI is scheduled in the second target long TTI and a HARQ feedback resource is allocated according to the scheduling information of the third short TTI.

Since the fourth short TTI is not scheduled in the $23^{rd}$ long TTI, a sub-control signaling may not be configured into the third short TTI.

The above steps 1321-1324 exemplarily describe how to configure the scheduling information of subsequent short TTIs and schedule the short TTIs in the second target long TTI.

It should be noted that, if the second target long TTI is a long TTI immediately after the first target long TTI, after the short TTI scheduling information is configured, the first equipment may schedule one or more short TTIs in the second target long TTI according to the short TTI scheduling information, and then sequentially send the first target long TTI and the second target long TTI scheduled with the one or more short TTIs to the second equipment.

If the first target long TTI and the second target long TTI are the same long TTI, it is not necessary to send the short TTI scheduling information to the second equipment through the first target long TTI first.

At step 14, HARQ feedback for each of the one or more short TTIs sequentially sent by the second equipment within the second target long TTI is received.

After receiving the second target long TTI, the second equipment may sequentially analyze each short TTI according to the obtained short TTI scheduling information. After one short TTI is analyzed, the HARQ feedback corresponding to the short TTI is generated, and the HARQ feedback is sent to the first equipment through the HARQ feedback resource corresponding to the short TTI, so that the first equipment may receive the HARQ feedback of the short TTI in time and determine whether the short TTI needs to be re-transmitted according to the HARQ feedback. Therefore, the feedback latency of short TTIs is reduced and it is ensured that the latency-sensitive service data is preferentially delivered.

Figure 7:
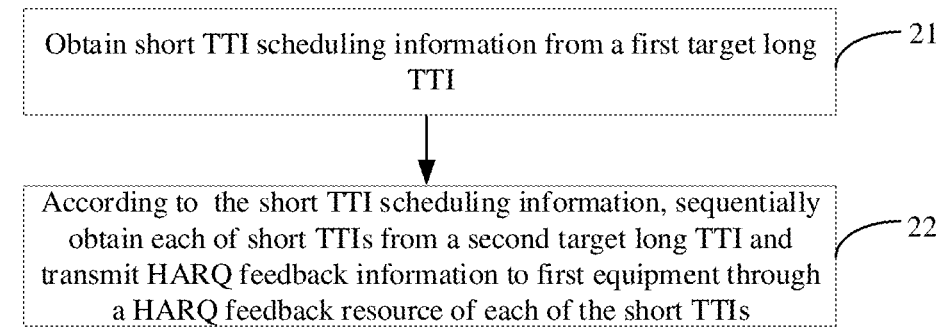
FIG. 7 is a flowchart of another method of obtaining HARQ feedback according to an example of the present disclosure.

Correspondingly, the present disclosure further provides a method of transmitting HARQ feedback, which is applied to second equipment. FIG. 7 is a flowchart of a method of transmitting HARQ feedback according to an example. The method includes:

At step 21, short TTI scheduling information is obtained from a first target long TTI. The short TTI scheduling information includes at least location information, length information, quantity information and location information of HARQ feedback resource of a short TTI. The second equipment transmits HARQ feedback of a short TTI to first equipment through the HARQ feedback resource of the short TTI.

When the first equipment sequentially sends the 50 long TTIs as shown in FIG. 1-1 to the second equipment, the second equipment does not know which long TTI is scheduled with short TTIs. Therefore, the second equipment first obtains the short TTI scheduling information configured in a long TTI by the first equipment, so that the second equipment analyzes short TTIs according to the short TTI scheduling information.

Figure 8:
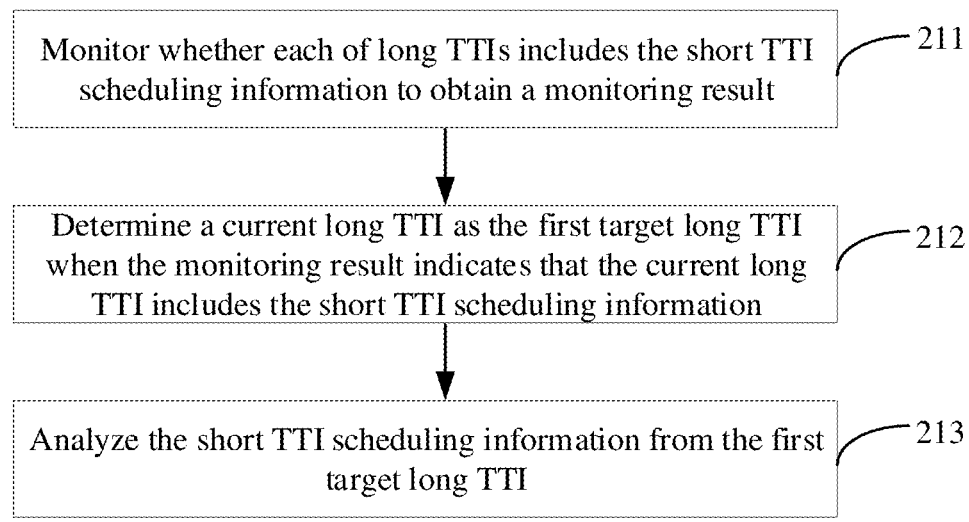
FIG. 8 is a flowchart of another method of obtaining HARQ feedback according to an example of the present disclosure.

Regarding how to obtain the short TTI scheduling information in the process of receiving the long TTIs, FIG. 8 is a flowchart of another method of obtaining HARQ feedback according to an example of the present disclosure. The step 21 may include:

At step 211, whether the short TTI scheduling information is included in each of the long TTIs is monitored to obtain a monitoring result.

When the first equipment performs information configuration, the first equipment may configure a control signaling in each long TTI, or intermittently configure a control signaling. Since the second equipment neither knows which long TTI is configured with a control signaling, nor knows which long TTI is associated with a control signaling configured with short TTI scheduling information, a monitoring mechanism may be activated to monitor whether each of the long TTIs includes the short TTI scheduling information to obtain a monitoring result.

At step 212, a current long TTI is determined as the first target long TTI when the monitoring result indicates that the current long TTI includes the short TTI scheduling information.

In examples of the present disclosure, the monitoring result of the second equipment may be represented by a bit 0 or 1. For example, when the monitoring result is 1, which indicates that the current long TTI includes short TTI scheduling information, the current long TTI is determined as the first target long TTI.

At step 213, the short TTI scheduling information is analyzed from the first target long TTI.

After the first target long TTI is determined, the short TTI scheduling information may be analyzed from the control signaling or the data field associated with the long TTI.

At step 22, according to the short TTI scheduling information, each of short TTIs is sequentially analyzed from a second target long TTI, and HARQ feedback is transmitted to the first equipment through a HARQ feedback resource of each of the short TTIs.

The second equipment first determines the second target long TTI according to the short TTI scheduling information, then sequentially receives the short TTI one by one in the second target long TTI and feeds back the HARQ information.

Figure 9:
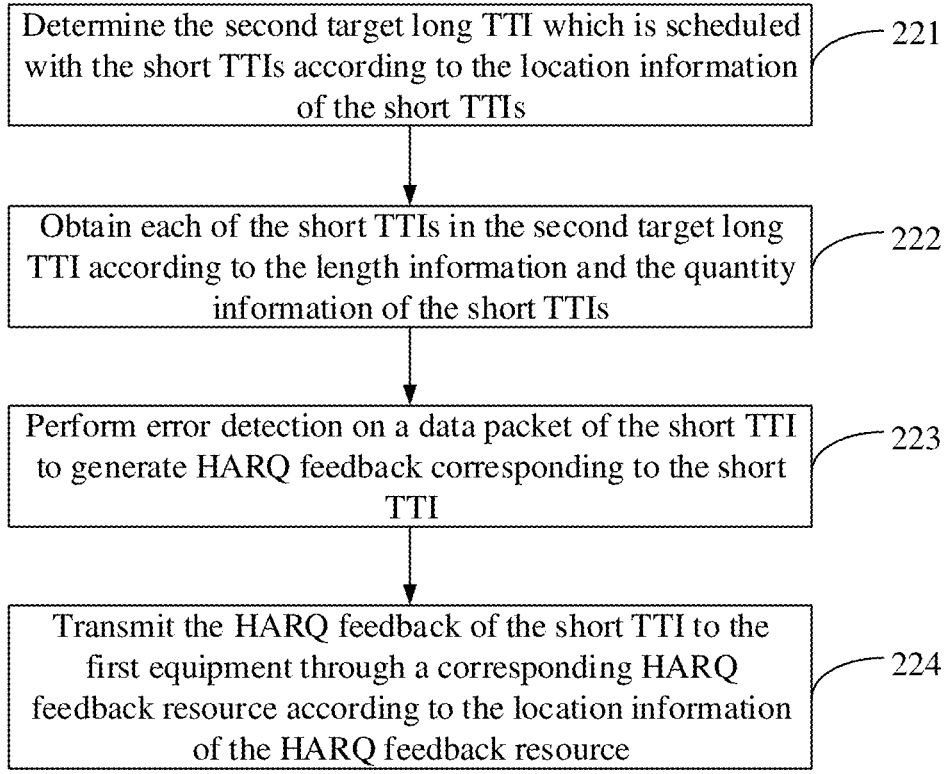
FIG. 9 is a flowchart of another method of obtaining HARQ feedback according to an example of the present disclosure.

Specifically, referring to FIG. 9, it is a flowchart of another method of transmitting HARQ feedback according to an example. The above step 22 may include:

At step 221, the second target long TTI to be scheduled with a short TTI is determined according to the location information of the short TTI.

It is assumed that the second equipment obtains the short TTI scheduling information in the received $22^{nd}$ long TTI, as shown in Table 3. Then, the user equipment knows that the first equipment is to schedule short TTIs in the $23^{rd}$ long TTI from the above Table 3.

At step 222, each of the short TTIs in the second target long TTI is obtained according to the length information and the quantity information of the short TTIs.

One of the above short TTIs may be any one of the short TTIs in the second target long TTI.

Take the scheduling information shown in Table 3 as an example. The second equipment sequentially obtains the first short TTI, the second short TTI and the third short TTI in the $23^{rd}$ long TTI according to the length information and the quantity information of short TTIs.

Figure 10:
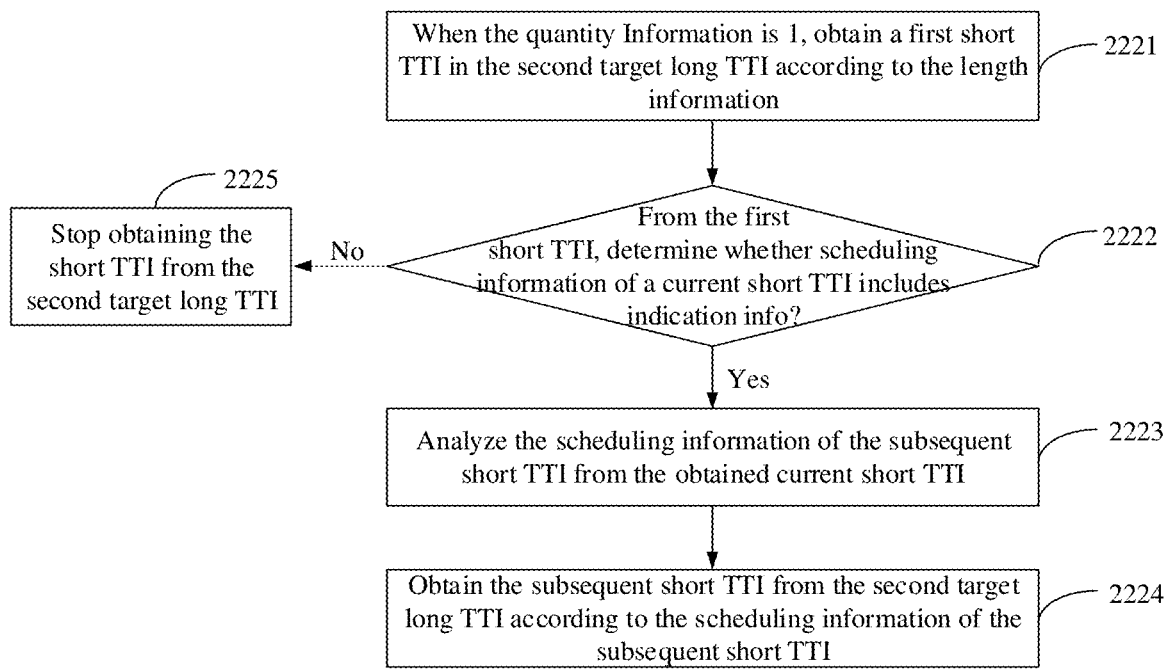
FIG. 10 is a flowchart of another method of obtaining HARQ feedback according to an example of the present disclosure.

In a case that the first target long TTI includes scheduling information of only one short TTI, referring to FIG. 10, it is a flowchart of another method of transmitting HARQ feedback according to an example. The step 222 may include:

At step 2221, when the quantity information indicates 1, the first short TTI in the second target long TTI is obtained according to the length information.

That is, after obtaining the short TTI scheduling information from the first target long TTI, the second equipment checks the quantity information in the scheduling information. If the quantity information indicates 1, it indicates that at least one short TTI is scheduled in the second target long TTI. The first short TTI may be analyzed from the second target long TTI according to the length information of short TTI recorded in the scheduling information.

As for how many short TTIs are scheduled in the second target long TTI, there may be two cases. In the first case, only one short TTI is scheduled in the second target long TTI, as shown in FIG. 3-3. In the second case, the second target long TTI includes at least two short TTIs and scheduling information of subsequent TTI(s) is not configured in the first target long TTI.

To determine whether a plurality of short TTIs are scheduled in the second target long TTI, starting from the first short TTI, the following steps 2222 to 2224 are sequentially performed.

At step 2222, it is determined whether scheduling information of a current short TTI includes indication information for indicating that the current short TTI includes scheduling information of a subsequent short TTI; if yes, step 2223 is performed; and if not, step 2225 is performed.

For example, assuming that the second target long TTI is the $23^{rd}$ long TTI, the indication information of the first short TTI is used to indicate that the first short TTI in the $23^{rd}$ long TTI includes the scheduling information of a subsequent short TTI.

At step 2223, if the scheduling information of the current short TTI includes the indication information, the scheduling information of a subsequent short TTI is analyzed from the current short TTI.

As described above, the scheduling information of the second short TTI is obtained from the first short TTI. Specifically, the scheduling information of the second short TTI may be obtained from the sub-control signaling associated with the first short TTI.

At step 2224, the subsequent short TTI in the second target long TTI is analyzed according to the scheduling information of the subsequent short TTI.

At step 2225, if the scheduling information of the current short TTI does not include the indication information, analyzing the short TTI from the second target long TTI is stopped.

At step 223, a HARQ feedback corresponding to the short TTI is generated by performing error detection on a data packet of the short TTI. The HARQ feedback may be an ACK signal or a NACK signal.

It is assumed that a current short TTI obtained by the second equipment is the first short TTI of the $23^{rd}$ long TTI, and the error detection is performed on the data packet of the first short TTI to obtain the HARQ feedback.

At step 224, the HARQ feedback of the short TTI is transmitted to the first equipment through a corresponding HARQ feedback resource according to the location information of HARQ feedback resource.

As described above, according to the location information of HARQ feedback resource recorded in Table 3, after generating the HARQ feedback of the first short TTI, the second equipment transmits the HARQ feedback of the first short TTI to the first equipment through the HARQ feedback resource which is immediately adjacent to the tail of the first short TTI in the $23^{rd}$ long TTI, such as the HARQ feedback resource 203 as shown in FIG. 3-1.

In another example of the present disclosure, the HARQ feedback resource specified for the HARQ feedback of the first short TTI may not be the HARQ feedback resource immediately adjacent to the first short TTI.

It can be seen that, in the method of transmitting the HARQ feedback provided by the disclosure, when the second equipment receives latency-insensitive service data, if latency-sensitive service data is to be obtained, the second equipment may receive latency-sensitive service data, which is transmitted in short TTIs, from the first equipment in time, and send feedback of the short TTIs to the first equipment in time. In this way, the latency-sensitive service data is obtained in time, the transmission latency of the latency-sensitive service data is reduced and the equipment performance is improved.

For brevity, the above method examples are all described as a series of combinations of actions, but those skilled in the art should understand that the present disclosure is not limited by the order of each of the described actions, because according to the present disclosure, some steps may be performed in other orders or at the same time.

In addition, those skilled in the art should also understand that examples described in the specification are optional examples, and the actions and modules involved are not necessarily required by the disclosure.

Corresponding to above examples of the application function implementation method, the present disclosure further provides examples of application function implementation apparatuses and corresponding terminals.

Figure 11:
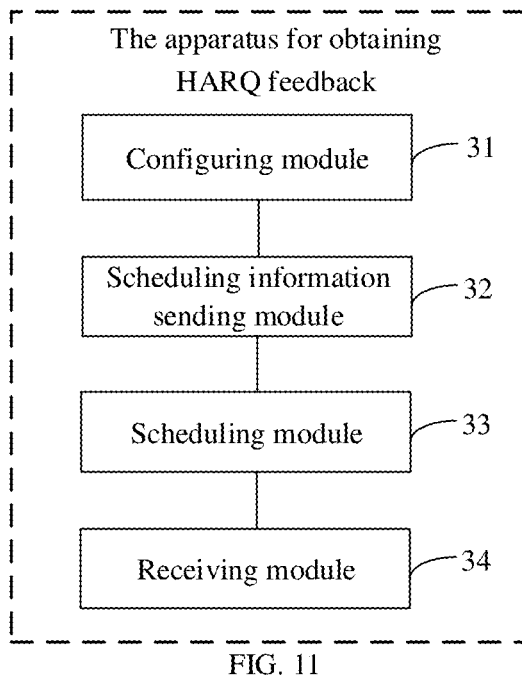
FIG. 11 is a block diagram of an apparatus for obtaining HARQ feedback according to an example of the present disclosure.

FIG. 11 is a block diagram of an apparatus for obtaining HARQ feedback according to an example of the present disclosure. The apparatus is applied in first equipment and may include:

a configuring module 31, to configure short TTI scheduling information into a first target long TTI according to service requirements, where the short TTI scheduling information includes at least location information, length information, quantity information and location information of HARQ feedback resource of a short TTI, the HARQ feedback resource of a short TTI is configured to send HARQ feedback of the short TTI to the first equipment from second equipment;

a scheduling information sending module 32, to send the short TTI scheduling information to the second equipment through the first target long TTI;

a scheduling module 33, to schedule one or more short TTIs in a second target long TTI according to the short TTI scheduling information and send the scheduled one or more short TTIs to the second equipment; and a receiving module 34, to receive HARQ feedback for each of the one or more short TTIs which is sequentially sent by the second equipment within the second target long TTI.

Figure 12:
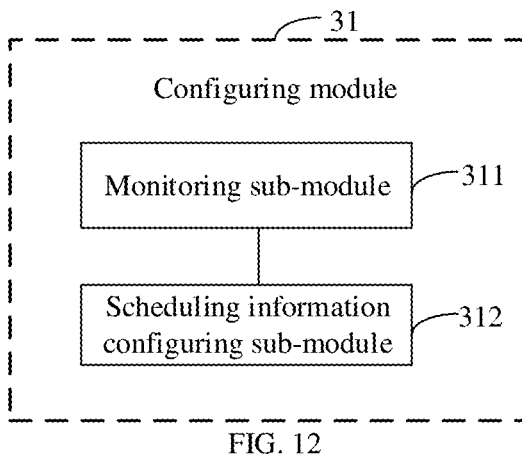
FIG. 12 is a block diagram of another apparatus for obtaining HARQ feedback according to an example of the present disclosure.

FIG. 12 is a block diagram of another apparatus for obtaining HARQ feedback according to an example of the present disclosure. Based on the example shown in FIG. 11, the configuring module 31 may include:

a monitoring sub-module 311, to monitor a low-latency service request when data is being transmitted through long TTIs; and a scheduling information configuring sub-module 312, to configure the short TTI scheduling information into the first target long TTI in response to determining that the low-latency service request is monitored, where low-latency service data is to be transmitted in short TTIs.

Figure 13:
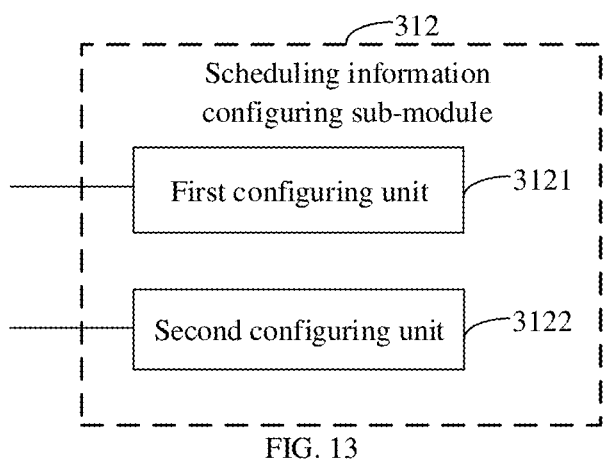
FIG. 13 is a block diagram of another apparatus for obtaining HARQ feedback according to an example of the present disclosure.

FIG. 13 is a block diagram of another apparatus for obtaining HARQ feedback according to an example of the present disclosure. Based on the example shown in FIG. 12, the scheduling information configuring sub-module 312 may include:

a first configuring unit 3121, to configure the short TTI scheduling information into a control signaling associated with the first target long TTI; or a second configuring unit 3122, to configure the short TTI scheduling information into a data field associated with the first target long TTI and configure location information of the short TTI scheduling information into a control signaling associated with the first target long TTI, where the location information of the short TTI scheduling information is used to indicate a storage location of the short TTI scheduling information in the data field associated with current long TTI.

Figure 14:
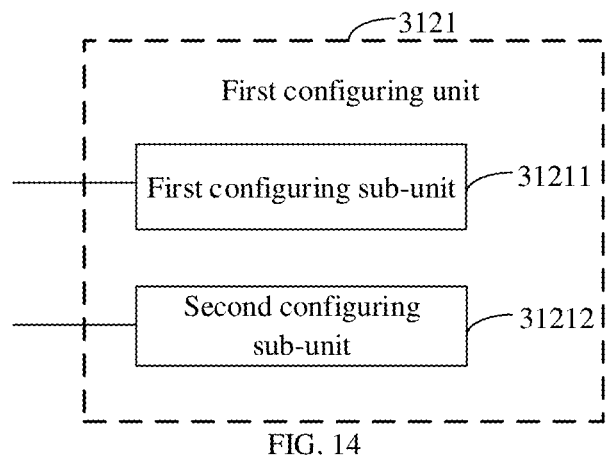
FIG. 14 is a block diagram of another apparatus for obtaining HARQ feedback according to an example of the present disclosure.

FIG. 14 is a block diagram of another apparatus for obtaining HARQ feedback according to an example Based on the example shown in FIG. 13, the first configuring unit 3121 may include:

a first configuring sub-unit 31211, to configure scheduling information of all short TTIs in a long TTI into the control signaling associated with the first target long TTI; or a second configuring sub-unit 31212, to configure scheduling information of a first short TTI in a long TTI into the control signaling associated with the first target long TTI, where the scheduling information of the first short TTI further includes indication information to indicate that the first short TTI includes scheduling information of a subsequent short TTI.

Figure 15:
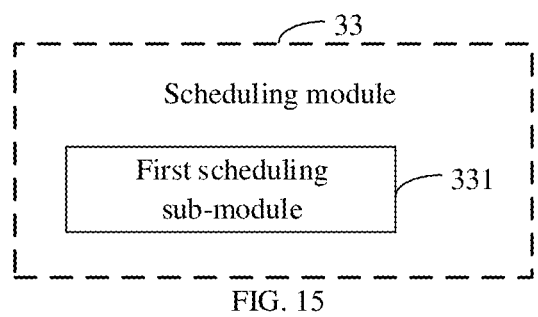
FIG. 15 is a block diagram of another apparatus for obtaining HARQ feedback according to an example of the present disclosure.

FIG. 15 is a block diagram of another apparatus for obtaining HARQ feedback according to an example. Based on the example shown in FIG. 11, the scheduling module 33 may include:

a first scheduling sub-module 331 configured to, when the first target long TTI is configured with scheduling information of all short TTIs in a long TTI, according to the scheduling information of all short TTIs, sequentially schedule each of the short TTIs within the second target long TTI and sequentially allocate a HARQ feedback resource for each of the short TTIs.

Figure 16:
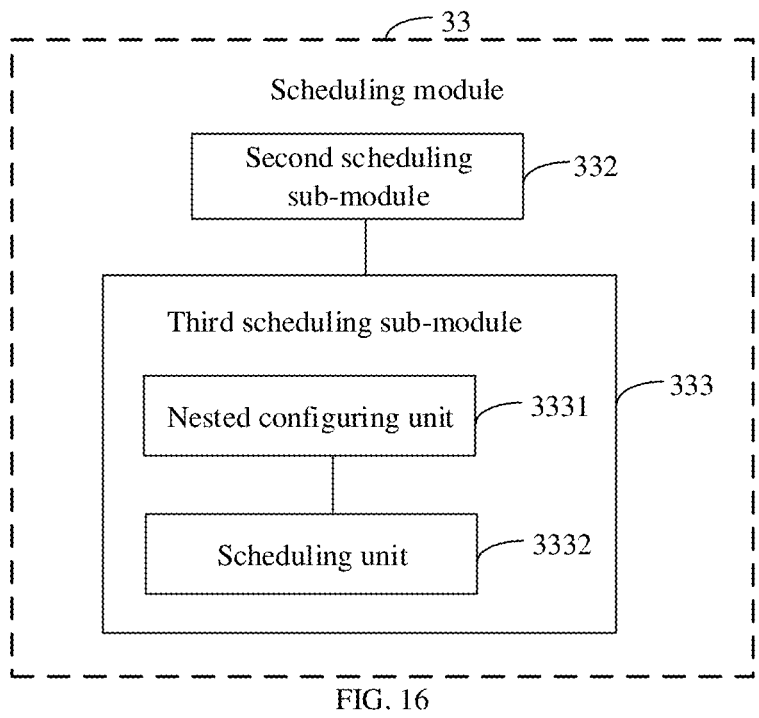
FIG. 16 is a block diagram of another apparatus for obtaining HARQ feedback according to an example of the present disclosure.

FIG. 16 is a block diagram of another apparatus for obtaining HARQ feedback according to an example. Based on the example shown in FIG. 11, the scheduling module 33 may include:

a second scheduling sub-module 332, to when a control signaling associated with the first target long TTI includes scheduling information of a first short TTI in a long TTI, according to the scheduling information of the first short TTI, schedule the first short TTI in the second target long TTI and allocate a HARQ feedback resource for the first short TTI; and a third scheduling sub-module 333, to sequentially trigger a nested configuring unit 3331 and a scheduling unit 3332 from the first short TTI to a second last short TTI.

The nested configuring unit 3331 is to configure scheduling information of a subsequent short TTI in a sub-control signaling associated with a current short TTI; where the scheduling information of the subsequent short TTI includes at least length information, location information of HARQ feedback resource and indication information.

The scheduling unit 3332 is to schedule the subsequent short TTI and allocate a HARQ feedback resource for the subsequent short TTI according to the scheduling information of the subsequent short TTI.

Figure 17:
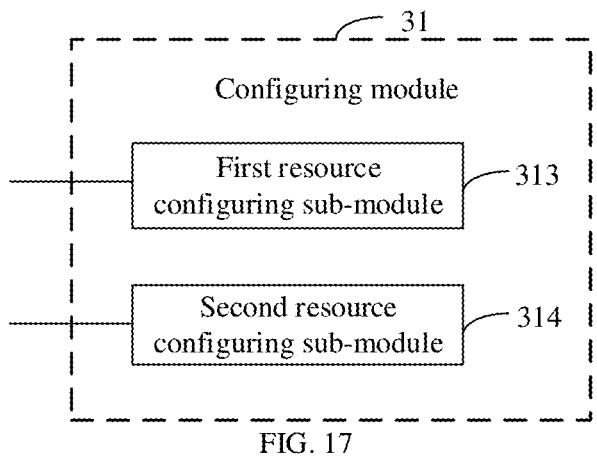
FIG. 17 is a block diagram of another apparatus for obtaining HARQ feedback according to an example of the present disclosure.

FIG. 17 is a block diagram of another apparatus for obtaining HARQ feedback according to an example. Based on the example shown in FIG. 11, the configuring module 31 may include:

a first resource configuring sub-module 313 to configure a HARQ feedback resource of each short TTI to be immediately adjacent to a tail of the short TTI; or a second resource configuring sub-module 314, to assigning a last one of the one or more short TTIs a HARQ feedback resource originally configured for the long TTI when the long TTI has redundant resources after one or more short TTIs are scheduled in the long TTI.

Figure 18:
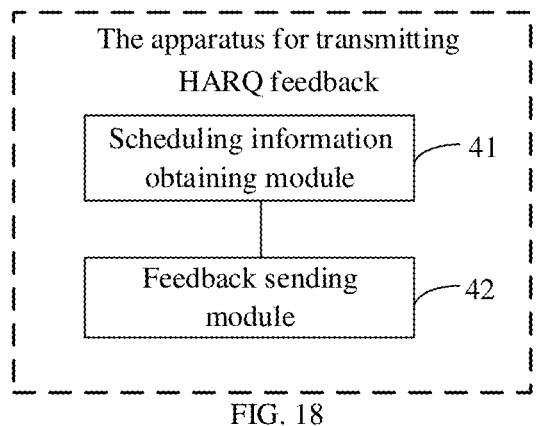
FIG. 18 is a block diagram of an apparatus for transmitting HARQ feedback according to an example of the present disclosure.

In addition, the present disclosure further provides an apparatus for transmitting HARQ feedback, which is applied in a second equipment. FIG. 18 is a block diagram of an apparatus for transmitting HARQ feedback according to an example. The apparatus may include:

a scheduling information obtaining module 41, to obtain short TTI scheduling information from a first target long TTI, where the short TTI scheduling information includes at least location information, length information, quantity information and location information of HARQ feedback resource of a short TTI, the HARQ feedback resource of a short TTI is configured to transmit HARQ feedback of the short TTI to first equipment from the second equipment; and a feedback sending module 42, to sequentially analyze each of short TTIs from a second target long TTI and send HARQ feedback to the first equipment through a HARQ feedback resource of each of the short TTIs according to the short TTI scheduling information.

Figure 19:
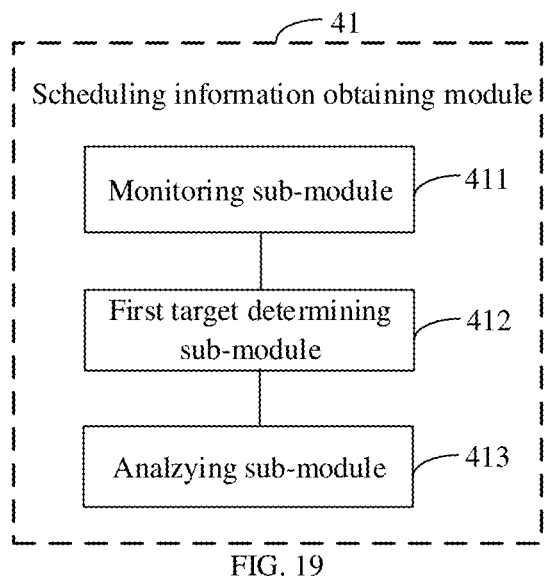
FIG. 19 is a block diagram of another apparatus for transmitting HARQ feedback according to an example of the present disclosure.

FIG. 19 is a block diagram of an apparatus for transmitting HARQ feedback according to an example. Based on the example of FIG. 18, the scheduling information obtaining module 41 may include:

a monitoring sub-module 411, to monitor whether each of long TTIs includes the short TTI scheduling information to obtain a monitoring result;

a first target determining sub-module 412, to determine a current long TTI as the first target long TTI when the monitoring result indicates that the current long TTI includes the short TTI scheduling information; and an analyzing sub-module 413, to analyze the short TTI scheduling information from the first target long TTI.

Figure 20:
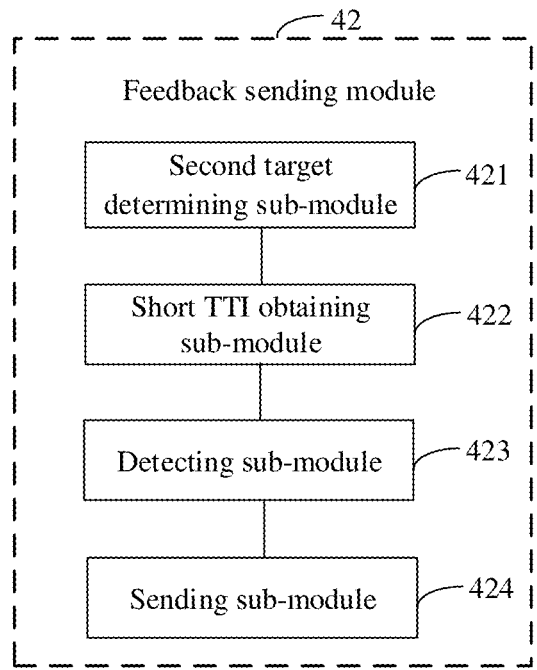
FIG. 20 is a block diagram of another apparatus for transmitting HARQ feedback according to an example of the present disclosure.

FIG. 20 is a block diagram of an apparatus for transmitting HARQ feedback according to an example Based on the example shown in FIG. 18, the feedback sending module 42 may include:

a second target determining sub-module 421, to determine the second target long TTI which is scheduled with the short TTIs according to the location information of the short TTIs;

a short TTI obtaining sub-module 422, to obtain each of the short TTIs in the second target long TTI according to the length information and the quantity information of the short TTIs;

a detecting sub-module 423, to perform error detection on a data packet of each of the short TTIs to generate HARQ feedback corresponding to the short TTI; and a sending sub-module 424, to transmit the HARQ feedback of each of the short TTIs to the first equipment through a corresponding HARQ feedback resource according to the location information of the HARQ feedback resource.

Figure 21:
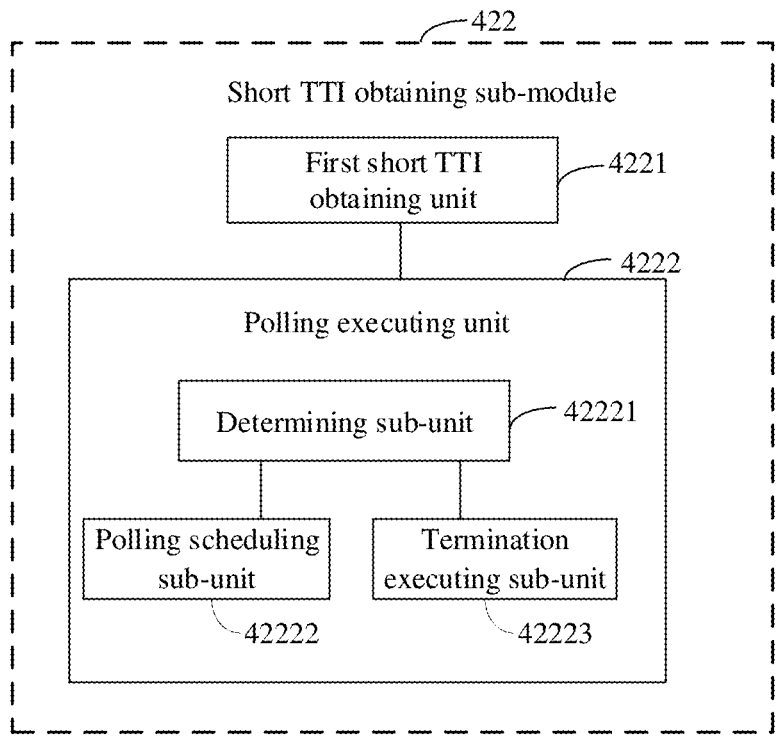
FIG. 21 is a block diagram of another apparatus for transmitting HARQ feedback according to an example of the present disclosure.

FIG. 21 is a block diagram of another apparatus for transmitting HARQ feedback according to an example Based on the example of FIG. 20, the short TTI obtaining sub-module 422 may include:

a first short TTI obtaining unit 4221, to obtain a first short TTI in the second target long TTI according to the length information when the quantity information indicates 1; and a polling executing unit 4222, to sequentially trigger a determining sub-unit 42221, a polling scheduling sub-unit 42222 or a termination executing sub-unit 42223 starting from the first short TTI.

The determining sub-unit 42221 is to determine whether scheduling information of a current short TTI includes indication information, where the indication information is used to indicate that the current short TTI includes scheduling information of a subsequent short TTI.

The polling scheduling sub-unit 42222 is to, in response to determining that the scheduling information of the current short TTI includes the indication information, analyze the scheduling information of the subsequent short TTI from the obtained current short TTI and analyze the subsequent short TTI from the second target long TTI according to the scheduling information of the subsequent short TTI.

The termination executing sub-unit 42223 is to, in response to determining that the scheduling information of the current short TTI does not include the indication information, stop analyzing the short TTI from the second target long TTI. With regard to the apparatuses in the above examples, the specific manner for the respective modules performing operations has been described in detail in related method examples, and further details are omitted herein.

Correspondingly, in one aspect, an apparatus for obtaining HARQ feedback is provided in examples of the present disclosure, which includes a processor and a memory to store instructions executable by the processor. The processor is to:

configure short TTI scheduling information into a first target long TTI according to service requirements, where the short TTI scheduling information includes at least location information, length information, quantity information and location information of HARQ feedback resource of a short TTI, the HARQ feedback resource of a short TTI is configured to send HARQ feedback of the short TTI to the first equipment from second equipment;

send the short TTI scheduling information to the second equipment through the first target long TTI;

schedule one or more short TTIs in a second target long TTI according to the short TTI scheduling information and send the scheduled one or more short TTIs to the second equipment; and receive HARQ feedback for each of the one or more short TTIs which is sequentially sent by the second equipment within the second target long TTI.

In another aspect, an apparatus for transmitting HARQ feedback is provided in examples of the present disclosure, which includes a processor and a memory to store instructions executable by the processor. The processor is to:

obtain short TTI scheduling information from a first target long TTI, where the short TTI scheduling information includes at least location information, length information, quantity information and location information of HARQ feedback resource of a short TTI, the HARQ feedback resource of a short TTI is configured to transmit HARQ feedback of the short TTI to first equipment from the second equipment;

according to the short TTI scheduling information, sequentially analyze each of short TTIs from a second target long TTI; and transmit HARQ feedback to the first equipment through a HARQ feedback resource of each of the short TTIs.

Figure 22:
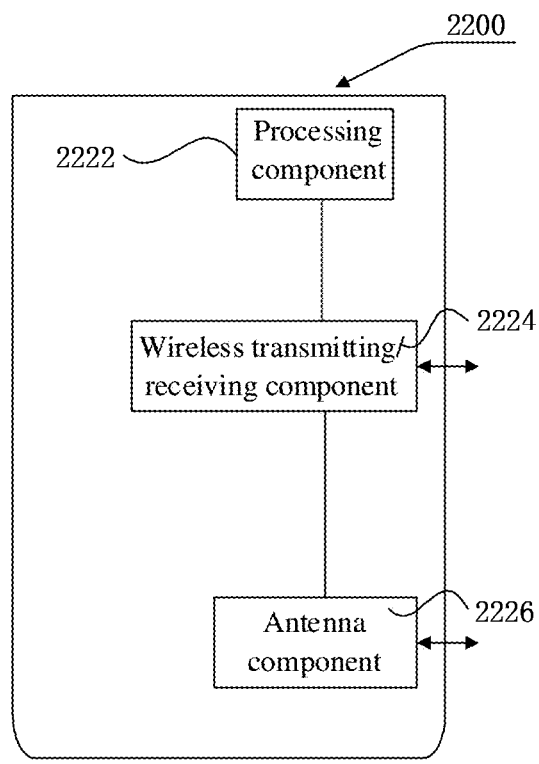
FIG. 22 is a schematic diagram of a structure of an apparatus for obtaining HARQ feedback according to an example of the present disclosure.

As shown in FIG. 22, FIG. 22 is a schematic diagram of a structure of an apparatus 2200 for obtaining HARQ feedback according to an example of the present disclosure. The apparatus 2200 may be provided as a base station. Referring to FIG. 22, the apparatus 2200 includes a processing component 2222, a wireless transmitting/receiving component 2224, an antenna component 2226, and a signal processing component specific to a wireless interface. The processing component 2222 may further include one or more processors.

One of the processing components 2222 may be to:

configure short TTI scheduling information into a first target long TTI according to service requirements, where the short TTI scheduling information includes at least location information, length information, quantity information and location information of HARQ feedback resource of a short TTI, the HARQ feedback resource of a short TTI;

send the short TTI scheduling information to user equipment through the first target long TTI;

schedule one or more downlink short TTIs in a second target long TTI according to the short TTI scheduling information and send the scheduled one or more short TTIs to the user equipment; and receive HARQ feedback for each of the one or more short TTIs which is sequentially sent by the user equipment within the second target long TTI.

Figure 23:
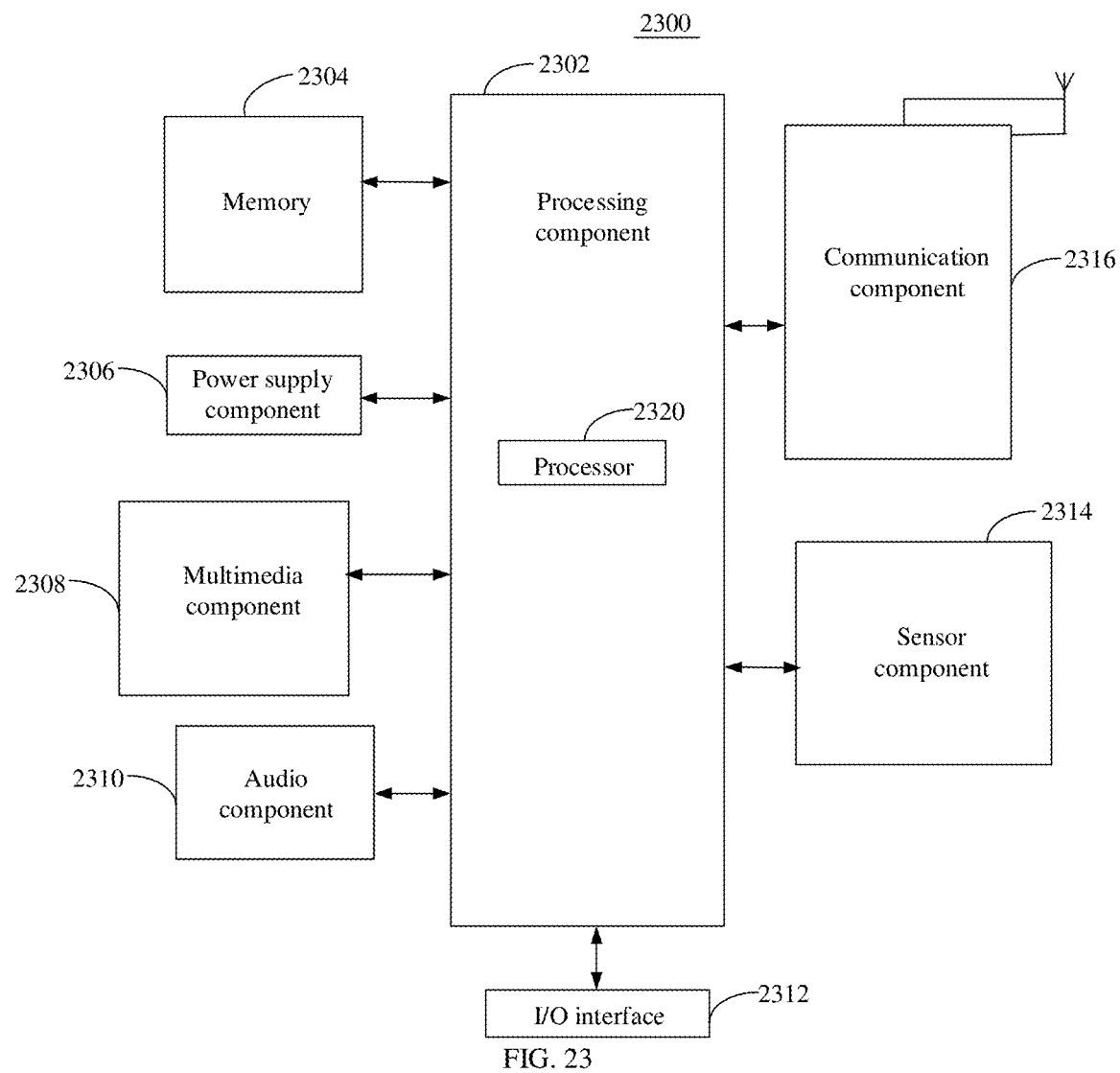
FIG. 23 is a schematic diagram of a structure of an apparatus for transmitting HARQ feedback according to an example of the present disclosure.

FIG. 23 is a schematic diagram of a structure of an apparatus 2300 for transmitting HARQ feedback according to an example of the present disclosure. For example, the apparatus 2300 may be a terminal, and may specifically be a mobile phone, a computer, a digital broadcasting terminal, a message receiving and sending device, a game console, a tablet device, a medical device, a fitness device, a personal digital assistant, a wearable device such as a smart watch, a smart glass, a smart band, a smart running shoe and so on.

Referring to FIG. 23, the apparatus 2300 may include one or more of the following components: a processing component 2302, a memory 2304, a power supply component 2306, a multimedia component 2308, an audio component 2310, an input/output (I/O) interface 2312, a sensor component 2314, and a communication component 2316.

The processing component 2302 generally controls overall operations of the apparatus 2300, such as operations associated with display, phone calls, data communications, camera operations, and recording operations. The processing component 2302 may include one or more processors 2310 to execute instructions to complete all or part of the steps of the above methods. In addition, the processing component 2302 may include one or more modules which facilitate the interaction between the processing component 2302 and other components. For example, the processing component 2302 may include a multimedia module to facilitate the interaction between the multimedia component 2308 and the processing component 2302.

The memory 2304 is to store various types of data to support the operation of the apparatus 2300. Examples of such data include instructions for any application or method operated on the apparatus 2300, contact data, phonebook data, messages, pictures, videos, and so on. The memory 2304 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 2306 provides power to different components of the apparatus 2300. The power supply component 2306 may include a power management system, one or more power supplies, and other components associated with generating, managing, and distributing power for the apparatus 2300.

The multimedia component 2308 includes a screen providing an output interface between the apparatus 2300 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 2308 may include a front camera and/or a rear camera. The front camera and/or rear camera may receive external multimedia data when the apparatus 2300 is in an operating mode, such as a photographing mode or a video mode. Each of the front camera and the rear camera may be a fixed optical lens system or have focal length and optical zooming capability.

The audio component 2310 is to output and/or input an audio signal. For example, the audio component 2310 includes a microphone (MIC). When the apparatus 2300 is in an operating mode, such as a call mode, a recording mode, and a voice recognition mode, the MIC is to receive an external audio signal. The received audio signal may be further stored in the memory 2304 or sent via the communication component 2316. In some examples, the audio component 2310 further includes a speaker to output an audio signal.

The I/O interface 2312 may provide an interface between the processing component 2302 and peripheral interface modules. The above peripheral interface modules may include a keyboard, a click wheel, buttons and so on. These buttons may include, but are not limited to, a home button, a volume button, a starting button and a locking button.

The sensor component 2314 includes one or more sensors to provide status assessments of various aspects for the apparatus 2300. For example, the sensor component 2314 may detect the on/off status of the apparatus 2300, and relative positioning of component, for example, the component is a display and a keypad of the apparatus 2300. The sensor component 2314 may also detect a change in position of the apparatus 2300 or a component of the apparatus 2300, a presence or absence of the contact between a user and the apparatus 2300, an orientation or an acceleration/deceleration of the apparatus 2300, and a change in temperature of the apparatus 2300. The sensor component 2314 may include a proximity sensor to detect the presence of a nearby object without any physical contact. The sensor component 2314 may further include an optical sensor, such as a Complementary Metal-Oxide-Semiconductor (CMOS) or Charged Coupled Device (CCD) image sensor which is used in imaging applications. In some examples, the sensor component 2314 may further include an acceleration sensor, a gyroscope sensor, a magnetic sensor, a pressure sensor, or a temperature sensor.

The communication component 2316 is to facilitate wired or wireless communication between the apparatus 2300 and other devices. The apparatus 2300 may access a wireless network that is based on a communication standard, such as Wi-Fi, 2G or 3G, or a combination thereof. In an example, the communication component 2316 receives a broadcast signal or broadcast-associated information from an external broadcast management system via a broadcast channel In an example, the communication component 2316 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In an example, the apparatus 2300 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is also provided a non-transitory machine-readable storage medium including instructions, such as a memory 2304 including instructions. The above instructions may be executed by the processor 2320 of the apparatus 2300 to perform the above methods. For example, the non-transitory machine-readable storage medium may be a Read-Only Memory (ROM), a Random-Access Memory (RAM), a Compact Disc ROM (CD-ROM), a magnetic tape, a floppy disk, and an optical data storage device and so on.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method of obtaining hybrid automatic repeat request (HARQ) feedback, which is applied in first equipment, the method comprising:
configuring short transmission time interval (TTI) scheduling information into a first target long TTI according to service requirements, wherein the short TTI scheduling information includes at least location information indicating a second target long TTI that includes one or more short TTIs, length information of each of the one or more short TTIs, quantity information indicating a number of the one or more short TTIs, and location information of HARQ feedback resource of a short TTI included in the second target long TTI, wherein the HARQ feedback resource of the short TTI is configured to send HARQ feedback of the short TTI to the first equipment from second equipment;

sending the short TTI scheduling information to the second equipment through the first target long TTI;

scheduling the one or more short TTIs in the second target long TTI according to the short TTI scheduling information, and sending a data packet in each of the scheduled one or more short TTIs in the second target long TTI to the second equipment; and receiving HARQ feedback from the second equipment, wherein the HARQ feedback corresponds to the data packet in each of the one or more scheduled short TTIs within the second target long TTI which is sequentially analyzed by the second equipment by:

determining, by the second equipment, the second target long TTI which is scheduled with the short TTIs according to the location information of the short TTIs;

obtaining, by the second equipment, each of the short TTIs in the second target long TTI according to the length information and the quantity information of the short TTIs;

performing, by the second equipment, error detection on the data packet in each of the short TTIs to generate HARQ feedback corresponding to the short TTI; and transmitting, by the second equipment, the HARQ feedback of each of the short TTIs to the first equipment through a corresponding HARQ feedback resource according to the location information of the HARQ feedback resource;

wherein obtaining, by the second equipment, each of the short TTIs in the second target long TTI according to the length information and the quantity information of the short TTIs comprises:

when the quantity information indicates 1, obtaining a first short TTI in the second target long TTI according to the length information; and starting from the first short TTI, sequentially performing following operations:

determining whether scheduling information of a current short TTI comprises indication information, wherein the indication information is used to indicate that the current short TTI comprises scheduling information of a subsequent short TTI;

in response to determining that the scheduling information of the current short TTI comprises the indication information, analyzing the scheduling information of the subsequent short TTI from the obtained current short TTI, and analyzing the subsequent short TTI from the second target long TTI according to the scheduling information of the subsequent short TTI; and in response to determining that the scheduling information of the current short TTI does not comprise the indication information, stopping analyzing the short TTI from the second target long TTI.

2. The method in accordance with claim 1, wherein when the first target long TTI is configured with scheduling information of all short TTIs in a long TTI, scheduling the one or more short TTIs in the second target long TTI according to the short TTI scheduling information comprises:

according to the scheduling information, sequentially scheduling each of the one or more short TTIs within the second target long TTI; and sequentially allocating a HARQ feedback resource for each of the one or more short TTIs.

3. The method in accordance with claim 1, wherein when a control signaling associated with the first target long TTI comprises scheduling information of a first short TTI in a long TTI, scheduling the one or more short TTIs in the second target long TTI according to the short TTI scheduling information comprises:

according to the scheduling information of the first short TTI, scheduling the first short TTI in the second target long TTI; and allocating a HARQ feedback resource for the first short TTI;

for the first short TTI to a penultimate short TTI, sequentially performing following operations:

configuring scheduling information of a subsequent short TTI in a sub-control signaling associated with a current short TTI; wherein the scheduling information of the current short TTI comprises at least length information, location information of HARQ feedback resource and indication information; and according to the scheduling information of the subsequent short TTI, scheduling the subsequent short TTI, and allocating a HARQ feedback resource for the subsequent short TTI.

4. The method in accordance with claim 1, wherein configuring the location information of HARQ feedback resource of a short TTI in the first target long TTI comprises:

configuring a HARQ feedback resource of each short TTI to be immediately adjacent to a tail of the short TTI; or when a long TTI has redundant resources after one or more short TTIs are scheduled in the long TTI, assigning a last one of the one or more short TTIs a HARQ feedback resource originally configured for the long TTI.

5. The method in accordance with claim 1, wherein configuring the short TTI scheduling information into the first target long TTI according to service requirements comprises:

monitoring a low-latency service request when data is being transmitted through long TTIs; and in response to determining that the low-latency service request is monitored, configuring the short TTI scheduling information into the first target long TTI, wherein low-latency service data is to be transmitted in short TTIs.

6. The method in accordance with claim 5, wherein configuring the short TTI scheduling information into the first target long TTI comprises:

configuring the short TTI scheduling information into a control signaling associated with the first target long TTI; or configuring the short TTI scheduling information into a data field associated with the first target long TTI and configuring location information of the short TTI scheduling information into a control signaling associated with the first target long TTI, wherein the location information of the short TTI scheduling information is used to indicate a storage location of the short TTI scheduling information in the data field associated with the current long TTI.

7. The method in accordance with claim 6, wherein configuring the short TTI scheduling information into the control signaling associated with the first target long TTI comprises:
configuring scheduling information of all short TTIs in a long TTI into the control signaling associated with the first target long TTI; or
configuring scheduling information of a first short TTI in a long TTI into the control signaling associated with the first target long TTI, wherein the scheduling information of the first short TTI further comprises indication information for indicating that the first short TTI comprises scheduling information of a subsequent short TTI.

8. A method of transmitting hybrid automatic repeat request (HARQ) feedback, which is applied in second equipment, the method comprising:
obtaining short transmission time interval (TTI) scheduling information from a first target long TTI, wherein the short TTI scheduling information comprises at least location information indicating a second target long TTI that includes one or more short TTIs, length information of each of the one or more short TTIs, quantity information indicating a number of the one or more short TTIs, and location information of HARQ feedback resource of a short TTI included in the second target long TTI, wherein the HARQ feedback resource of the short TTI is configured to transmit HARQ feedback of the short TTI to first equipment from the second equipment; and
according to the short TTI scheduling information, sequentially obtaining a data packet in each of short TTIs from the second target long TTI and transmitting HARQ feedback to the first equipment through a HARQ feedback resource of each of the short TTIs,
wherein according to the short TTI scheduling information, sequentially obtaining the data packet in each of short TTIs from the second target long TTI and transmitting the HARQ feedback to the first equipment through the HARQ feedback resource of each of the short TTIs comprises:
determining the second target long TTI which is scheduled with the short TTIs according to the location information of the short TTIs;
obtaining each of the short TTIs in the second target long TTI according to the length information and the quantity information of the short TTIs;
performing error detection on the data packet in each of the short TTIs to generate HARQ feedback corresponding to the short TTI; and
transmitting the HARQ feedback of each of the short TTIs to the first equipment through a corresponding HARQ feedback resource according to the location information of the HARQ feedback resource;
wherein obtaining each of the short TTIs in the second target long TTI according to the length information and the quantity information of the short TTIs comprises:
when the quantity information indicates 1, obtaining a first short TTI in the second target long TTI according to the length information; and
starting from the first short TTI, sequentially performing following operations:
determining whether scheduling information of a current short TTI comprises indication information, wherein the indication information is used to indicate that the current short TTI comprises scheduling information of a subsequent short TTI;
in response to determining that the scheduling information of the current short TTI comprises the indication information, analyzing the scheduling information of the subsequent short TTI from the obtained current short TTI, and
analyzing the subsequent short TTI from the second target long TTI according to the scheduling information of the subsequent short TTI; and
in response to determining that the scheduling information of the current short TTI does not comprise the indication information, stopping analyzing the short TTI from the second target long TTI.

9. The method in accordance with claim 8, wherein obtaining the short TTI scheduling information from the first target long TTI comprises:
monitoring whether each of long TTIs comprises the short TTI scheduling information to obtain a monitoring result;
determining a current long TTI as the first target long TTI when the monitoring result indicates that the current long TTI comprises the short TTI scheduling information; and
analyzing the short TTI scheduling information from the first target long TTI.

10. An apparatus for obtaining hybrid automatic repeat request (HARQ) feedback, which is applied in first equipment, the apparatus comprising:
a processor; and
a memory storing instructions executable by the processor;
wherein the processor is to:
configure short transmission time interval (TTI) scheduling information into a first target long TTI according to service requirements, wherein the short TTI scheduling information includes at least location information indicating a second target long TTI that includes one or more short TTIs, length information of each of the one or more short TTIs, quantity information indicating a number of the one or more short TTIs, and location information of HARQ feedback resource of a short TTI included in the second target long TTI, wherein the HARQ feedback resource of the short TTI is configured to send HARQ feedback of the short TTI to the first equipment from second equipment;
send the short TTI scheduling information to the second equipment through the first target long TTI;
schedule the one or more short TTIs in the second target long TTI according to the short TTI scheduling information and send a data packet in each of the scheduled one or more short TTIs in the second target long TTI to the second equipment; and
receive HARQ feedback from the second equipment, wherein the HARQ feedback corresponds to the data packet in each of the one or more scheduled short TTIs within the second target long TTI which is sequentially analyzed by the second equipment by:
determining, by the second equipment, the second target long TTI which is scheduled with the short TTIs according to the location information of the short TTIs;

obtaining, by the second equipment, each of the short TTIs in the second target long TTI according to the length information and the quantity information of the short TTIs;

performing, by the second equipment, error detection on the data packet in each of the short TTIs to generate HARQ feedback corresponding to the short TTI; and transmitting, by the second equipment, the HARQ feedback of each of the short TTIs to the first equipment through a corresponding HARQ feedback resource according to the location information of the HARQ feedback resource;

wherein obtaining, by the second equipment, each of the short TTIs in the second target long TTI according to the length information and the quantity information of the short TTIs comprises:

when the quantity information indicates 1, obtaining a first short TTI in the second target long TTI according to the length information; and starting from the first short TTI, sequentially performing following operations:

determining whether scheduling information of a current short TTI comprises indication information, wherein the indication information is used to indicate that the current short TTI comprises scheduling information of a subsequent short TTI;

in response to determining that the scheduling information of the current short TTI comprises the indication information, analyzing the scheduling information of the subsequent short TTI from the obtained current short TTI, and analyzing the subsequent short TTI from the second target long TTI according to the scheduling information of the subsequent short TTI; and in response to determining that the scheduling information of the current short TTI does not comprise the indication information, stopping analyzing the short TTI from the second target long TTI.

11. The apparatus in accordance with claim 10, wherein the processor is further configured to:

when the first target long TTI is configured with scheduling information of all short TTIs in a long TTI, according to the scheduling information, sequentially schedule each of the one or more short TTIs within the second target long TTI and sequentially allocate a HARQ feedback resource for each of the one or more short TTIs.

12. The apparatus in accordance with claim 10, wherein when a control signaling associated with the first target long TTI comprises scheduling information of a first short TTI in a long TTI, the processor is further configured to:

according to the scheduling information of the first short TTI, schedule the first short TTI in the second target long TTI and allocate a HARQ feedback resource for the first short TTI; and for the first short TTI to a penultimate short TTI:

configure scheduling information of a subsequent short TTI into a sub-control signaling associated with a current short TTI; wherein the scheduling information of the current short TTI comprises at least length information, location information of HARQ feedback resource and indication information; and schedule the subsequent short TTI and allocate a HARQ feedback resource for the subsequent short TTI according to the scheduling information of the subsequent short TTI.

13. The apparatus in accordance with claim 10, wherein the processor is further configured to:

configure a HARQ feedback resource of each short TTI to be immediately adjacent to a tail of the short TTI; or assign a last one of the one or more short TTIs a HARQ feedback resource originally configured for a long TTI.

14. The apparatus in accordance with claim 10, wherein the processor is further configured to:

monitor a low-latency service request when data is being transmitted through long TTIs; and configure the short TTI scheduling information into the first target long TTI in response to determining that the low-latency service request is monitored, wherein low-latency service data is to be transmitted in short TTIs.

15. The apparatus in accordance with claim 14, wherein the processor is further configured to:

configure the short TTI scheduling information into a control signaling associated with the first target long TTI; or configure the short TTI scheduling information into a data field associated with the first target long TTI and configure location information of the short TTI scheduling information into a control signaling associated with the first target long TTI, wherein the location information of the short TTI scheduling information is used to indicate a storage location of the short TTI scheduling information in the data field associated with current long TTI.

16. The apparatus in accordance with claim 15, wherein the processor is further configured to:

configure scheduling information of all short TTIs in a long TTI into the control signaling associated with the first target long TTI; or configure scheduling information of a first short TTI in a long TTI into the control signaling associated with the first target long TTI, wherein the scheduling information of the first short TTI further comprises indication information for indicating that the first short TTI comprises scheduling information of a subsequent short TTI.

17. An apparatus for transmitting HARQ feedback, comprising:

a processor; and a memory storing instructions executable by the processor;

wherein the processor is configured to perform the method of claim 8.

18. The apparatus in accordance with claim 17, wherein the processor is further configured to:

monitor whether each of long TTIs comprises the short TTI scheduling information to obtain a monitoring result;

determine a current long TTI as the first target long TTI when the monitoring result indicates that the current long TTI comprises the short TTI scheduling information; and analyze the short TTI scheduling information from the first target long TTI.

* * * * *